US008903036B2

United States Patent
Ishida et al.

(10) Patent No.: US 8,903,036 B2
(45) Date of Patent: Dec. 2, 2014

(54) JET PUMP AND REACTOR

(75) Inventors: Naoyuki Ishida, Hitachi (JP); Hisamichi Inoue, Takahagi (JP)

(73) Assignee: Hitachi-GE Nuclear Energy, Ltd., Ibaraki (JP)

(*) Notice: Subject to any disclaimer, the term of this patent is extended or adjusted under 35 U.S.C. 154(b) by 222 days.

(21) Appl. No.: 13/407,032

(22) Filed: Feb. 28, 2012

(65) Prior Publication Data

US 2012/0156060 A1     Jun. 21, 2012

Related U.S. Application Data

(60) Division of application No. 13/020,463, filed on Feb. 3, 2011, now Pat. No. 8,467,492, which is a continuation of application No. 12/685,764, filed on Jan. 12, 2010, now Pat. No. 8,712,003.

(30) Foreign Application Priority Data

Jan. 22, 2009   (JP) .................... 2009-011479

(51) Int. Cl.
| | | |
|---|---|---|
| *G21C 15/00* | (2006.01) | |
| *F04F 5/10* | (2006.01) | |
| *F04F 5/54* | (2006.01) | |
| *G21C 15/25* | (2006.01) | |
| *F04F 5/46* | (2006.01) | |

(52) U.S. Cl.
CPC ............ *F04F 5/462* (2013.01); *Y02E 30/40* (2013.01); *F04F 5/10* (2013.01); *F04F 5/54* (2013.01); *G21C 15/25* (2013.01)
USPC ............ 376/407; 376/347; 376/361; 376/402

(58) Field of Classification Search
CPC ...... G21C 15/00; G21C 15/24; G21C 15/243; G21C 15/25; G21C 3/3305; G21C 3/3315; F04F 5/10; F04F 5/18; F04F 5/46; F04F 4/462; F04F 5/54
USPC ......... 376/347, 361, 366, 370, 372, 392, 407; 417/86, 151
See application file for complete search history.

(56) References Cited

U.S. PATENT DOCUMENTS

| | | | | |
|---|---|---|---|---|
| 3,625,820 | A | * 12/1971 | Gluntz et al. | ............. 376/372 |
| 3,838,002 | A | *  9/1974 | Gluntz et al. | ............. 376/407 |
| 4,285,770 | A |    8/1981 | Chi et al. | |
| 4,468,172 | A |    8/1984 | Dixon et al. | |

FOREIGN PATENT DOCUMENTS

| | | |
|---|---|---|
| JP | 57-90983   | 11/1955 |
| JP | 49-100604  | 9/1974 |
| JP | 52-5301    | 2/1977 |
| JP | 58-015798  | 1/1983 |
| JP | 59-159489  | 9/1984 |
| JP | 59-188100  | 10/1984 |
| JP | 59-48360   | 11/1984 |

(Continued)

*Primary Examiner* — Jack W Keith
*Assistant Examiner* — Marshall O'Connor
(74) *Attorney, Agent, or Firm* — Antonelli, Terry, Stout & Kraus, LLP.

(57) ABSTRACT

A nozzle apparatus of a jet pump includes a nozzle base member, and a plurality of nozzles installed to the nozzle base member and forming a plurality of narrowing portions, in which a fluid passage cross-sectional area of a driving fluid passage formed in the nozzle is reduced.

5 Claims, 13 Drawing Sheets

(56) References Cited

FOREIGN PATENT DOCUMENTS

| JP | 07-119700 | 5/1995 |
| JP | 2001-090700 | 4/2001 |
| JP | 2007-285165 | 11/2007 |
| JP | 2008-082752 | 4/2008 |

* cited by examiner

JET PUMP AND REACTOR

CROSS REFERENCE TO RELATED APPLICATION

This application is a division of U.S. application Ser. No. 13/020,463, filed Feb. 3, 2011 now U.S. Pat. No. 8,467,492, which is a continuation of U.S. application Ser. No. 12/685,764, filed Jan. 12, 2010 now U.S. Pat. No. 8,712,003, the contents of which are incorporated herein by reference.

CLAIM OF PRIORITY

The present application claims priority from Japanese Patent application serial no. 2009-011479, filed on Jan. 22, 2009, the content of which is hereby incorporated by reference into this application.

BACKGROUND OF THE INVENTION

1. Technical Field

The present invention relates to jet pump and reactor and, in particular, to a jet pump and a reactor suitable for applying to a boiling water reactor.

2. Background Art

A conventional boiling water reactor (BWR) has a jet pump in a reactor pressure vessel (hereinafter referred to as an RPV) to which a recirculation pipe is connected. The jet pump has a nozzle, a bell mouth, a throat, and a diffuser. Cooling water in a downcomer, where the jet pump is disposed, formed in the RPV is pressurized by operation of a recirculation pump, pumped through the recirculation pipe as a driving flow, and ejected from the nozzle into the throat. The nozzle increases the speed of the driving flow. The cooling water around the nozzle in the downcomer is sucked into the bell mouth as a suction flow due to the working of the ejected driving flow, passes the throat, and flows into the diffuser. The cooling water discharged from the diffuser is supplied to a core through a lower plenum in the RPV (see, for example, U.S. Pat. No. 3,625,820, Japanese Patent Laid-open No. Sho 59 (1984)-188100, Japanese Patent Laid-open No. Hei 7 (1995)-119700, and Japanese Patent Laid-open No. 2007-285165).

Jet pumps disclosed in Japanese Patent Laid-open No. Sho 59 (1984)-188100, Japanese Patent Laid-open No. Hei 7 (1995)-119700, and Japanese Patent Laid-open No. 2007-285165 each have a plurality of nozzles. When the total area of each ejection opening formed in the plurality of nozzles remains constant, an increase in the number of nozzles increases the contact area between driving flows and suction flows, and thus mixing of the driving flows and the suction flows is promoted. Consequently, a mixing loss is decreased, increasing efficiency of the jet pump.

A jet pump installed in a reactor has a nozzle connected to a raiser pipe that is installed in the RPV. In this jet pump, an elbow pipe, the nozzle, a bell mouth and a throat are unified into one body, which structure allows the elbow to the throat to be removed for inspection and maintenance. A connection portion between the throat and the diffuser has a joint structure in which a lower end portion of the throat is inserted into an upper end portion of the diffuser. This joint structure is a slip joint. The slip joint, where the throat and the diffuser are connected, has a structure which allows the upper end portion of the diffuser and the lower end portion of the throat to slide up and down, so that no stress is generated due to the difference between the thermal expansions of the raiser pipe and the diffuser. For this reason, a gap is formed between an inner surface of the diffuser's upper end portion and an outer surface of the throat's lower end portion. Part of the cooling water that flows into the diffuser from the throat leaks out to the downcomer through the gap. This leakage flow prevents a foreign object from being caught in the gap or deposited on the surfaces. However, when the flow rate of the leakage flow exceeds a limit, the jet pump may start to vibrate. Thus, in order to suppress the vibration of the jet pump, the leakage flow from the gap in the slip joint should be limited below the limit.

Although it is not a jet pump, Japanese Examined Utility Model Application Publication No. Sho 52 (1977)-5301 discloses a fluid sealing joint used for pipes for introducing high-temperature and high-pressure gas (or steam). In this fluid sealing joint, a tubular inlet-side joint portion is inserted into a tubular outlet-side joint portion; and an end portion of the inlet joint portion has a narrowing portion whose flow passage cross-sectional area decreases and an expanding portion whose cross-sectional area increases toward the end. A communication hole is formed in the place where the narrowing portion and the expanding portion are connected, the flow passage cross-sectional area of which the place is the smallest in the inlet-side joint portion. This communication hole communicates with an annular space portion formed between the inlet-side joint portion and the outlet-side joint portion. Static pressure inside is reduced at the seam between the narrowing portion and the expanding portion so that a fluid in the annular space portion is sucked inside the narrowing portion through the communication hole. This effectively prevents a fluid from leaking out of the fluid sealing joint through a gap between the inlet-side joint portion and the outlet-side joint portion.

Japanese Patent Laid-open No. Sho 59 (1984)-159489 discloses a jet pump for suppressing vibration. In this jet pump, a lower end portion of a throat, which is inserted into an upper end portion of a diffuser, has a flow passage cross-sectional area that diminishes toward the end.

Other than that, for the purpose of reducing the amount of cooling water leaking from a slip joint of a jet pump, a way of forming a labyrinth seal on an outer surface of a lower end portion of a throat in the slip joint is known (see, for example, Japanese Examined Patent Application Publication No. Sho 59 (1984)-48360).

A jet pump illustrated in FIG. 3 of Japanese Patent Laid-open No. 2001-90700 has a venturi tube and a nozzle that ejects a driving flow into the venturi tube a driving flow. This nozzle has an inner cylinder and an outer cylinder that surrounds the inner cylinder. A driving flow passage formed between the inner cylinder and the outer cylinder is an annular passage whose cross-sectional area gradually decreases towards the discharge side of the driving flow. The driving flow supplied to the driving flow passage is ejected from one end (a discharge opening) of the driving flow passage into the venturi tube. Cleaning water around the nozzle is sucked into the venturi tube due to the driving flow ejected from the nozzle. To be more specific, this cleaning water flows into the venturi tube through each of a first cooling water suction passage formed between the nozzle and the venturi tube and a second cooling water suction passage formed inside the inner cylinder. From the nozzle, the annular driving flow is ejected. Cross sections of the annular driving flow are similar to continuous rings.

Japanese Patent Laid-open No. 2008-82752 discloses a jet pump applicable to a BWR. This jet pump has a ring header for supplying a driving flow surrounding a suction flow suction passage formed in the center of the jet pump; and a nozzle portion installed to a lower end of the ring header, surrounding the suction flow suction passage, having a plurality of ejection openings in an annular arrangement, where the ejection openings eject a driving flow fed to the ring header.

PRIOR ART LITERATURES

Patent Literatures

Patent Literature 1: U.S. Pat. No. 3,625,820
Patent Literature 2: Japanese Patent Laid-open No. Sho 59 (1984)-188100
Patent Literature 3: Japanese Patent Laid-open No. Hei 7 (1995)-119700
Patent Literature 4: Japanese Patent Laid-open No. 2007-285165
Patent Literature 5: Japanese Examined Utility Model Application Publication No. Sho 52 (1977)-5301
Patent Literature 6: Japanese Patent Laid-open No. Sho 59 (1984)-159489
Patent Literature 7: Japanese Examined Patent Application Publication No. Sho 59 (1984)-48360
Patent Literature 8: Japanese Patent Laid-open No. 2001-90700
Patent Literature 9: Japanese Patent Laid-open No. 2008-82752

SUMMARY OF THE INVENTION

Problem for Solving by the Invention

For the soundness of a jet pump, excessive vibration of the jet pump is undesirable. Each slip joint disclosed in Japanese Examined Utility Model Application Publication No. Sho 52 (1977)-5301 and Japanese Patent Laid-open No. Sho 59 (1984)-159489 can suppress a leakage flow from a slip joint and reduce vibration caused by the leakage flow. However, each slip joint has a flow passage cross-sectional area that changes, or decreases, where the structure somewhat increases a pressure loss in the slip joint. For this reason, when these slip joints are applied to a jet pump, the efficiency of the jet pump is reduced for the increased amount of pressure loss.

In Japanese Examined Patent Application Publication No. Sho 59 (1984)-48360, a labyrinth seal is provided to a slip joint. When a labyrinth seal is fabricated on the outer surface of a throat, its fabrication range is limited to the thickness of the throat and the length of insertion. For this reason, when the fabrication range is insufficient, a desired effect in leakage flow reduction may not be achieved.

An object of the present invention is to provide a jet pump and a reactor, which can suppress the vibration of the jet pump and improve the efficiency of the jet pump.

Means for Solving the Problem

The present invention for achieving the above object is characterized in that a nozzle apparatus has a nozzle base member, and a plurality of nozzles installed to the nozzle base member and forming a plurality of narrowing portions in which a fluid passage cross-sectional area of a driving fluid passage formed in the nozzle is reduced; and in a lower end portion of a throat inserted into a diffuser, a cross-sectional area of a fluid passage formed in the throat diminishes toward a downstream end of the throat.

Since, in the lower end portion of the throat inserted into the diffuser, the cross-sectional area of the fluid passage formed in the throat diminishes toward the downstream end of the throat, the amount of a fluid leaking from a space between the throat and the diffuser can be reduced and the vibration of the jet pump can be suppressed.

Since the nozzle apparatus has the nozzle base member and the plurality of nozzles installed to the nozzle base member and forming the plurality of narrowing portions, in which the fluid passage cross-sectional area of the driving flow passage is reduced, inside itself, the efficiency of the jet pump can be increased after compensating for a loss in jet pump efficiency caused by the diminishment of the fluid passage cross-sectional area in the throat.

The above object can also be achieved by a jet pump comprising a nozzle apparatus having a header portion disposing a first pipe member forming a suction fluid passage for introducing a suction fluid, inside the head portion, and including an annular passage, which surrounds the first pipe member, for introducing a driving fluid, and a nozzle portion installed to the header portion, is surrounding the first pipe member, and forming an ejection outlet, which is communicated with the annular passage formed in the header portion, for ejecting the driving fluid; and a second pipe member, one end of which is connected to the nozzle apparatus, forming a driving fluid passage for introducing the driving fluid to annular passage in the header portion, wherein the first pipe member is disposed inside the driving fluid passage formed in the second pipe member through the one end of the second pipe member, and an opening for the suction flow passage is formed on an outer surface of the second pipe member and opened toward outside of the second pipe member;

the driving flow passage is formed in a way that the driving fluid flowing toward the one end of the second pipe member hits the first pipe member diagonally in the axial direction of the first pipe member; and, in the lower end portion of a throat inserted into a diffuser, a cross-sectional area of a fluid passage formed in the throat diminishes toward a downstream end of the throat.

Since, in the lower end portion of the throat inserted into the diffuser, the cross-sectional area of the fluid passage formed in the throat diminishes toward the downstream end of the throat, the amount of a fluid leaking from a space between the throat and the diffuser can be reduced and the vibration of the jet pump can be suppressed.

Since the driving fluid passage formed inside the second pipe member is formed so that the driving fluid flowing toward the one end of the second pipe member hits the first pipe member diagonally to the axial direction of the first pipe member, pressure loss inside the driving fluid passage is decreased. Since the speed of the driving fluid ejected from the annular ejection outlet of the nozzle portion becomes faster, the flow rate of the suction fluid sucked inside the jet pump body is increased. From above, efficiency of the jet pump is improved. Part of this increase in the jet pump efficiency can compensate for a decrease in the jet pump efficiency caused by the diminishment of the flow passage cross-sectional area in the throat.

The above object can also be achieved by a jet pump comprising a nozzle apparatus having a first tubular member; a second tubular member disposed in the first tubular member, apart from the first tubular member; a fluid passage forming-member disposed in the first tubular member, and installed to an upper end portion of the second tubular member; a plurality of passage members fixing both ends to the first and the second tubular members and disposed in the circumferential direction of the nozzle apparatus; and an annular ejection outlet is formed between a lower portion of the first tubular member and a lower portion of the second tubular member;

Wherein a suction passage formed in each of the passage members, for introducing a suction fluid from the outside to the inside, communicates with an inner region formed in the second tubular member, an annular driving fluid passage for introducing the driving fluid, across which each of the passage members is disposed, is formed between the first tubular member, and the second tubular member and the flow passage forming member, and communicated with the annular ejection outlet, the ejection outlet-side portion of the driving fluid passage slopes inward toward a lower end of the nozzle apparatus, and, in a lower end portion of a throat inserted into a diffuser, a cross-sectional area of a fluid passage formed in the throat diminishes toward a downstream end of the throat.

Since, in the lower end portion of the throat inserted into the diffuser, the cross-sectional area of the fluid passage formed in the throat diminishes toward the downstream end of the throat, the amount of fluid leaking from a space between the throat and the diffuser can be reduced and the vibration of the jet pump can be suppressed.

Since the ejection outlet-side portion of the driving fluid passage slopes inward toward the lower end of the nozzle apparatus, degree of negative pressure in the inner region is increased, increasing the flow rate of the suction fluid flowing into the inner region through the suction passage. Furthermore, since the ejection outlet-side portion of the driving fluid passage slopes inward toward the lower end of the nozzle apparatus, the width of a gap between the lower end of the outer circumference portion of the nozzle apparatus and the upper end of a jet pump body is increased. This increases the flow rate of a suction fluid flowing into the jet pump body through the gap. From these increases in the flow rates, the efficiency of the jet pump is further increased. Part of this increase in the jet pump efficiency can compensate for a decrease in jet pump efficiency caused by the diminishment of the fluid passage cross-sectional area in the throat.

Advantageous Effect of the Invention

According to the present invention, the vibration of a jet pump can be suppressed and the efficiency of the jet pump can be improved.

DETAILED DESCRIPTION OF THE PREFERRED EMBODIMENTS

Figure 1:
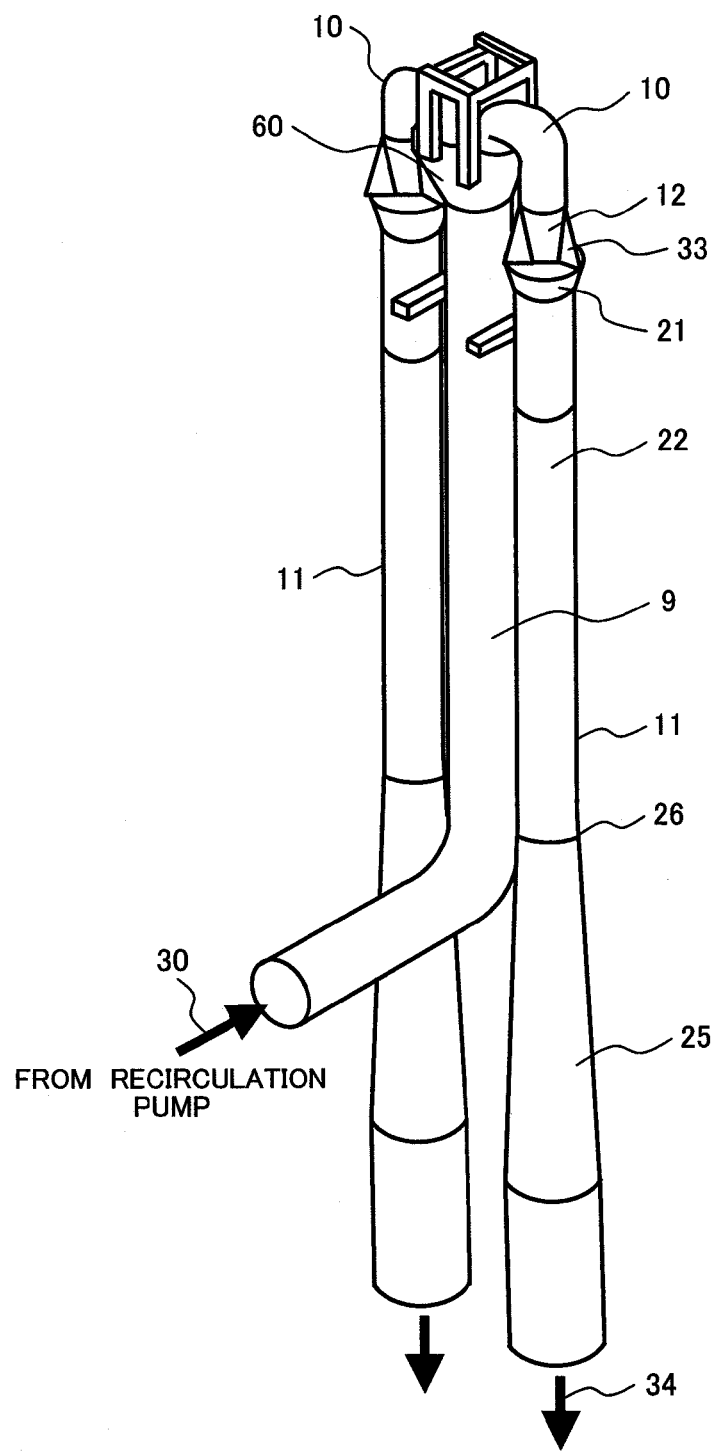
FIG. 1 is a perspective view showing a jet pump according to embodiment 1 applied to a boiling water reactor, which is a preferred embodiment of the present invention.

Various embodiments of the present invention are described below.

[Embodiment 1]

A jet pump installed to a boiling water reactor, according to an embodiment of the present invention is described below with reference to FIGS. 1, 2, and 3. Before explaining a structure of the jet pump of the present embodiment, an overall structure of a boiling water reactor to which this jet pump is applied is described below with reference to FIGS. 1 and 4.

The boiling water reactor (BWR) has a reactor pressure vessel (reactor vessel) 1 and a core shroud 3 installed in the reactor pressure vessel. Hereinafter, the reactor pressure vessel is referred to as an RPV. A core 2 loaded with a plurality of fuel assemblies (not shown) is disposed in the core shroud 3. A steam separator 4 and a steam dryer 5 are disposed above the core 2 in the RPV 1. A plurality of jet pumps 11 is disposed in an annular downcomer 6 formed between the RPV 1 and the core shroud 3. A recirculation system provided to the RPV 1 includes a recirculation pipe 7 and a recirculation pump 8 installed to the recirculation pipe 7. One end of the recirculation pipe 7 communicates with the downcomer 6. Another end of the recirculation pipe 7 is connected to a lower end of a raiser pipe 9 disposed in the downcomer 6. An upper end of the raiser pipe 9 is connected to a branching pipe 60. An elbow pipe (a curved pipe) 10 attached to the branching pipe 60 is connected to a nozzle apparatus 12 of the jet pump 11. A main steam pipe 39 and a feed water pipe 28 are connected to the RPV 1. The nozzle apparatus 12 is fixed to a bell mouth 21 using a plurality of supporting plates 33, and makes up one body with the bell mouth 21.

Cooling water (suction fluid, coolant), which is suction flow existing in an upper portion of the RPV 1, is mixed with feed water supplied from the feed water pipe 28 to the RPV 1, and descends in the downcomer 6. This cooling water is sucked into the recirculation pipe 7 by operation of the recirculation pump 8, and pressurized by the recirculation pump 8. This pressurized cooling water is called a driving flow (a driving fluid) 30 for descriptive purposes. The driving flow 30 flows through the recirculation pipe 7, the raiser pipe 9, the branching pipe 60, and the elbow pipe 10, and reaches the nozzle apparatus 12 of the jet pump 11 to be ejected from the nozzle apparatus 12. The cooling water 32, which is a suction flow around the nozzle apparatus 12 (see FIG. 3), is sucked into a throat 22 from the bell mouth 21 due to the working of a jet flow 31 of the driving flow 30 (see FIG. 3). The cooling water 32 descends with the driving flow 30 in the throat 22, and discharged from a lower end of a diffuser 25. The cooling water discharged from the diffuser 25 (including the suction flow 32 and the driving flow 30) is called cooling water 34 for descriptive purposes. The cooling water 34 passes through a lower plenum 29 and is supplied to the core 2. The cooling water 34 is heated while passing the core 2 and becomes a two-phase flow including water and steam. The steam separator 4 separates the gas-liquid two-phase flow into steam and water. The steam dryer 5 removes further moisture from the separated steam, and the steam from which the moisture is removed is exhausted to the main steam pipe 39. This steam is introduced to a steam turbine (not shown) and turns the steam turbine. A power generator (not shown) coupled to the stream turbine rotates to generate power. The steam exhausted from the steam turbine becomes water through condensation in a condenser (not shown). This condensed water is supplied into the RPV 1 as feed water through the feed water pipe 28. The water separated by the separator 4 and the dryer 5 descends and reaches the downcomer 6 as cooling water.

The jet pump 11 of the present embodiment, which has the nozzle apparatus 12, the bell mouth 21, the throat 22, and the diffuser 25 as its main components, can supply more cooling water 34 to the core with less driving flow 30 by sucking the cooling water around the nozzle apparatus 12 in the downcomer 6. When the kinetic energy of the driving flow 30 given by the recirculation pump 8 effectively acts on the cooling water 32, more cooling water 32 is sucked into the jet pump 11 and the flow rate of the cooling water 34 is increased more. The jet pump 11 reduces static pressure in the throat 22 by ejecting the driving flow 30 (the jet flow 31) at high speed from the nozzle apparatus 12 into the throat 22. This makes the throat 22 suck in the cooling water 32, and allows the necessary core flow rate to be obtained with a small amount of power. The diffuser 25 has a flow passage cross-sectional area which gradually increases toward the downstream direction within a degree that prevents detachment of cooling water flow. This diffuser 25 changes the kinetic energy of the cooling water into pressure. In the diffuser 25, the pressure of the suction flow 32 is raised higher than the pressure at the position where the suction flow is sucked into the bell mouth 21. A flow passage cross-sectional area of the bell mouth 21 increases toward the upstream direction.

The bell mouth 21, the throat 22, and the diffuser 25 are disposed in this order from the upper position to the lower position. A jet pump body comprises the bell mouth 21, the throat 22, and the diffuser 25. The nozzle apparatus 12 is disposed above the bell mouth 21.

A structure of a slip joint 26 in the jet pump 11 of the present embodiment is described with reference to FIG. 2. This slip joint 26 has, in a lower end portion (a downstream end portion) of the throat 22, a flow passage reduction portion 23 whose flow passage cross-sectional area gradually diminishes toward a lower end of the throat 22. An inner diameter D6 of a downstream end (the lower end) of the flow passage reduction portion 23 is smaller than an inner diameter D5 of an upstream end (an upper end) of the flow passage reduction portion 23. Part of this flow passage reduction portion 23 is inserted into an upper end portion (an upstream end portion) of the diffuser 25. The flow passage reduction portion 23 has a thick-wall portion 24 on the outer surface. Formation of this thick-wall portion 24 reduces the width of a gap 27 in the radial direction of the throat 22, which gap is formed between the flow passage reduction portion 23 and the diffuser 25.

Figure 5:
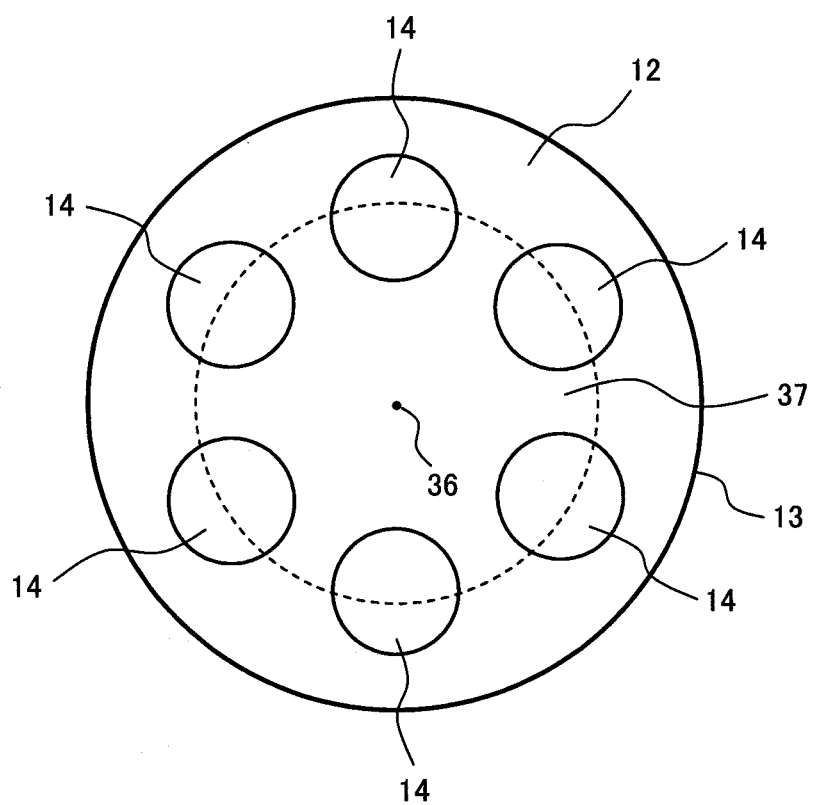
FIG. 5 is a sectional view taken along V-V of FIG. 3.
Figure 6:
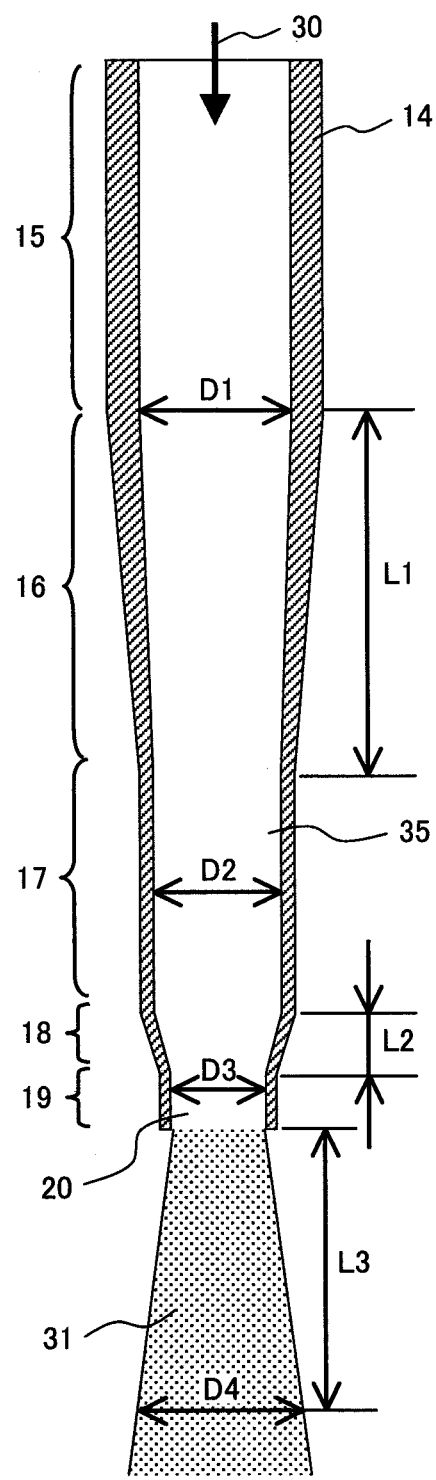
FIG. 6 is a longitudinal sectional view showing a nozzle shown in FIG. 3.

A detailed structure of the nozzle apparatus 12 in the jet pump 11 is described below with reference to FIGS. 3, 5, and 6. The nozzle apparatus 12 has a nozzle base (a nozzle base member) 13 and six nozzles 14. The nozzle base 13 of the nozzle apparatus 12 is fixed to the bell mouth 21 by using the supporting plates 33 to make up one body, and connected to the elbow pipe 10. The nozzle apparatus 12 is disposed above the bell mouth 21. The nozzle base 13 has a protrusion 36 protruding downward, in the center of the nozzle apparatus. The six nozzles 14 are fixed to the nozzle base 13 in an annular arrangement, disposed around the protrusion 36. These nozzles 14 extend toward the bell mouth 21 from the nozzle base 13.

A detailed structure of the six nozzles 14 provided to the nozzle apparatus 12 is described with reference to FIG. 6. In the nozzle 14, when the inner diameters, that is, the passage diameters of a jet passage 35 formed inside the nozzle 14, are sequentially defined as D1, D2, and D3 from the upstream end to the downstream end of the nozzle 14, these inner diameters have a relationship which is D1>D2>D3.

Figure 3:
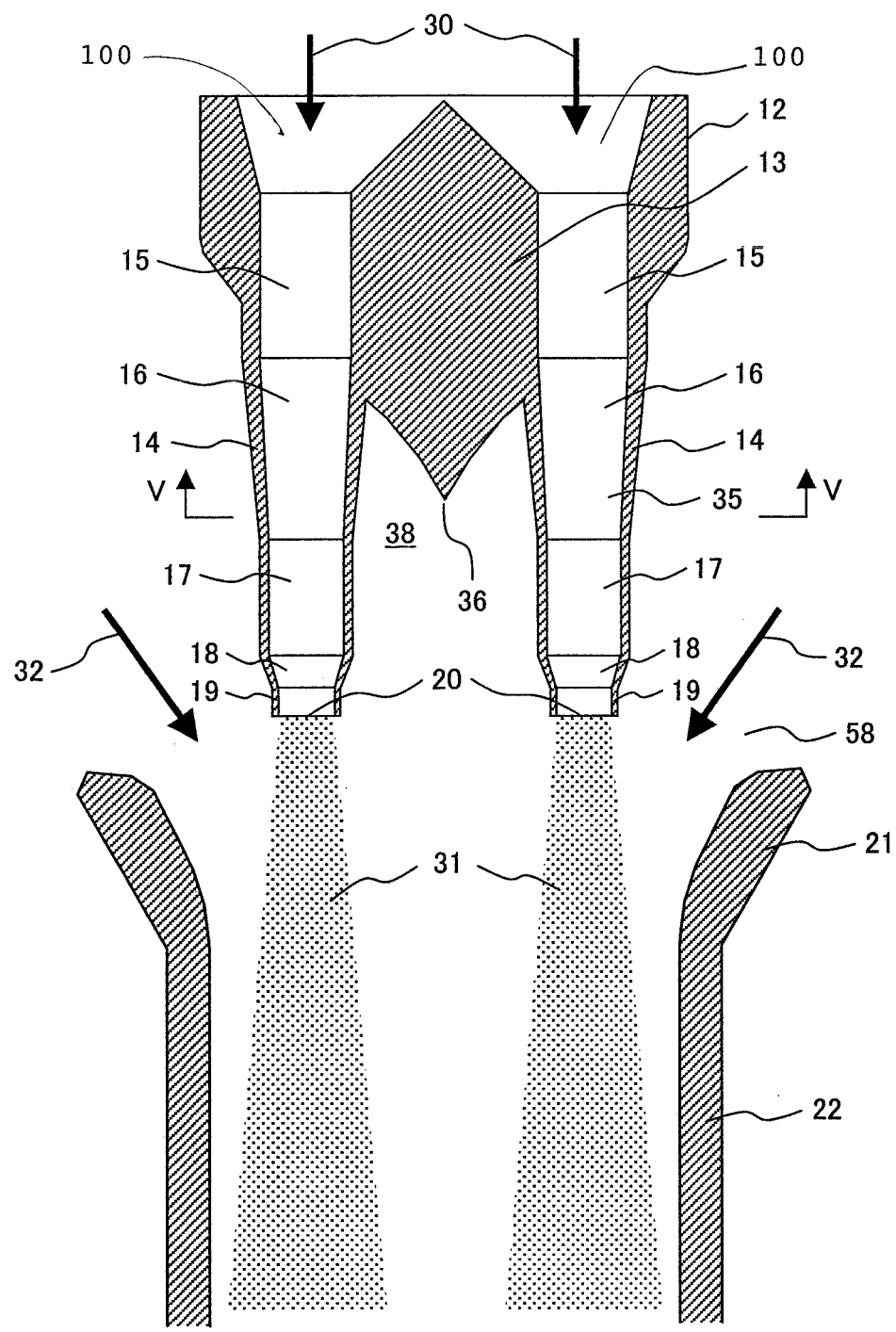
FIG. 3 is a longitudinal sectional view showing a nozzle apparatus shown in FIG. 1.

In the nozzle apparatus 12, as shown in FIG. 3, the nozzle 14 has a nozzle narrowing portion 100, a nozzle straight-tube portion 15, a nozzle narrowing portion 16, a nozzle straight-tube portion 17, a nozzle narrowing portion 18, and a nozzle lower end portion 19. The nozzle straight-tube portion 15 positioned in an upper position following the narrowing portion 100 has a uniform inner diameter of D1. In the nozzle narrowing portion 16, which is the second stage of narrowing, connected to a downstream end of the nozzle straight-tube portion 15, a flow passage cross-sectional area in the narrowing portion 16 decreases toward a lower end of the nozzle 14, an inner diameter at an upper end is D1, the inner diameter at a lower end is D2, and the length is L1. The nozzle straight-tube portion 17 connected to the downstream end of the nozzle narrowing portion 16 has a uniform inner diameter of D2. In the nozzle narrowing portion 18, which is the third stage of narrowing, connected to a downstream end of the nozzle straight-tube portion 17, a flow passage cross-sectional area in the narrowing portion 18 decreases toward the lower end of the nozzle 14, an inner diameter at an upper end is D2, the inner diameter at a lower end is D3, and the length is L2. The nozzle lower end portion 19 located in a lowest position of the nozzle 14, connected to the lower end of the nozzle narrowing portion 18 has an inner diameter of D3 and forms an ejection outlet 20 in the end portion.

Unlike the nozzle in Japanese Patent Laid-open No. Sho 59(1984)-188100, in which a nozzle narrowing portion is formed only in one place in its end portion, the nozzle 14 narrows the jet passage 35 in three places in the nozzle narrowing portions 100, 16 and 18. A narrowing angle θ1 of the nozzle narrowing portion 16 and a narrowing angle θ2 of the nozzle narrowing portion 18 can be calculated by the following Equation (1) and Equation (2) respectively.

$$\theta 1 = \tan^{-1}((D1-D2)/2/L1) \qquad (1)$$

$$\theta 2 = \tan^{-1}((D2-D3)/2/L2) \qquad (2)$$

The narrowing angle θ2 of the nozzle narrowing portion 18 near the ejection outlet 20 is larger than the narrowing angle θ1 of the nozzle narrowing portion 16 (θ2>θ1). The nozzle straight-tube portion 15 having a larger flow passage cross-sectional area is disposed upstream from the nozzle narrowing portion 16, and the nozzle straight-tube portion 17 having a smaller flow passage cross-sectional area is disposed downstream from the nozzle narrowing portion 16 respectively.

The nozzle lower end portion 19, which is a straight tube having an inner diameter of D3 and the ejection outlet 20 in its end, is preferably disposed at an outlet portion of the nozzle 14, that is, the lower end portion of the nozzle 14. However, in order to improve the flow speed of the jet flow 31 ejected from the ejection outlet 20, a nozzle narrowing portion having a flow passage cross-sectional area which gradually decreases toward the downstream end may be used in place of the nozzle lower end portion 19 being the straight-tube.

When the nozzle narrowing portion having a flow passage cross-sectional area which gradually decreases toward the downstream end is used as the nozzle lower end portion 19, it is preferable to reduce the narrowing angle θ of the nozzle narrowing portion 18 of this nozzle to approximately less than 2 degrees in order to keep the spreading of the jet flow 31 from the ejection outlet 20 of the nozzle lower end portion 19, within a desirable range.

The driving flow 30 discharged from the recirculation pump 8 during the operation of the boiling water reactor is introduced through the raiser pipe 9 and the elbow pipe 10 and supplied into the nozzle base 13 of the nozzle apparatus 12. This driving flow 30 is introduced to the jet passage 35 of each nozzle 14. A flow passage cross-sectional area of the jet passage 35 varies according to the inner diameters of the nozzle narrowing portion 100, the nozzle straight-tube portion 15, the nozzle narrowing portion 16, the nozzle straight-tube portion 17, the nozzle narrowing portion 18, and the nozzle lower end portion 19 disposed from the upper position to the lower position. The driving flow 30 flowing into the jet passage 35 flows through the nozzle narrowing portion 100, the nozzle straight-tube portion 15, the nozzle narrowing portion 16, the nozzle straight-tube portion 17, and the nozzle narrowing portion 18, and reaches the nozzle lower end portion 19. The driving flow 30 descends in the jet passage 35 gradually gains speed in the nozzle narrowing portion 16, and gains speed even faster in the nozzle narrowing portion 18 than in the nozzle narrowing portion 16. The accelerated driving flow 30 is ejected from the ejection outlet 20 into the throat 22.

In the nozzle narrowing portion 18, a velocity component toward the central axis of the nozzle 14 is given to the driving flow 30. However, since a fluid has a characteristic to flow along a wall surface, the jet flow 31 ejected from the ejection outlet 20 formed at the lower end of the nozzle lower end portion 19 has a diameter of D3. Since the larger the narrowing angle θ2 of the nozzle narrowing portion 18, the more the momentum flows toward the central axis of the nozzle, the spreading of the jet flow 31 ejected from the ejection outlet 20 can be suppressed. As a consequence, and the diameter D4 of the jet flow 31, which is a distance L3 away from the ejection outlet 20 in the downstream direction, can be small within a desirable range. The diameter D4 of the jet flow 31 is a width of the jet flow 31. The smaller the diameter D4 of the jet flow 31, the faster the speed of this jet flow.

When the jet flow 31 is ejected from the nozzle 14 into the throat 22 while the spreading of the jet flow 31 is suppressed and its speed maintained, the static pressure inside the throat 22 is reduced, making more suction flow 32 around the nozzle apparatus 12 in the downcomer 6 to be sucked into the bell mouth 21.

Assume that no nozzle lower end portion 19 is disposed downstream from the nozzle narrowing portion 18. In this case, a diameter of the jet flow 31 keeps decreasing even after being ejected because of the momentum of the driving flow 30 toward the central axis of the nozzle 14, given in the nozzle narrowing portion 18. That is, since no straight-tube portion of the nozzle lower end portion 19 is provided, the jet flow 31 ejected from the ejection outlet 20 formed in the lower end of the nozzle 14 is affected by the nozzle narrowing is portion 18. This makes the diameter D4 of the jet flow 31 at the distance L3 away from the ejection outlet 20 in the downstream direction, smaller than the inner diameter D3 of the ejection outlet 20. Thus, the jet speed is raised and the acceleration loss is increased, reducing the flow rate of the driving flow 30.

For this reason, the nozzle lower end portion 19 being the straight-tube portion is installed in the downstream side of the nozzle narrowing portion 18 to keep the diameter of the jet flow 31 ejected from the ejection outlet 20 to be no smaller than the inner diameter D3 of the nozzle lower end portion 19 being the straight-tube portion. The installation of the nozzle lower end portion 19 prevents the reduction in the flow rate of the driving flow 30 caused by the increase in the acceleration loss.

In addition, the nozzle narrowing portions are provided to the nozzle 14 in two or more locations to reduce the pressure loss in the nozzle 14 as well as to widen the flow passage for the suction flow 32, formed between the nozzles 14.

Next, the following case is considered where the inner diameter of the ejection outlet 20 is fixed to D3, the nozzle narrowing portion 16 is made straight, each inner diameter of the nozzle straight-tube portion 15 and the nozzle narrowing portion 16, which is now a straight tube, is set to D2, and a nozzle narrowing portion formed in the nozzle 14 is only in one place in the nozzle narrowing portion 18. When the length L2 of the nozzle narrowing portion 18 is unchanged, the flow passage cross-sectional areas of the nozzle straight-tube portion 15 and the nozzle narrowing portion 16, which is now straight, become smaller, increasing the flow speed of the driving flow 30 flowing inside. Consequently, a loss in friction is increased and the flow rate of the driving flow 30 is reduced. When the length L2 of the nozzle narrowing portion 18 is extended to enlarge the flow passage cross-sectional area of the nozzle narrowing portion 18 in the upstream side, the outer diameter of the nozzle 14 becomes larger and a flow passage cross-sectional area of the suction flow 32 formed among the plurality of nozzles 14 becomes smaller, reducing the suction amount of the suction flow 32 into the bell mouth 21.

Therefore, in the present embodiment that two or more nozzle narrowing portions are provided to the nozzle 14, a flow passage cross-sectional area of the jet passage 35 in the nozzle 14 becomes smaller toward the ejection outlet 20, and the flow speed of the driving flow 30 flowing in the jet passage 35 is increased. Because of this, the area where the loss in friction is increased in the jet passage 35 can be reduced. In addition, since the outer diameter of the nozzle 14 can be made smaller below the nozzle narrowing portion 16, a space 37 (see FIG. 5) formed among the nozzles 14 can be larger, and the flow rate of the suction flow 32 sucked into a region 38 (see FIG. 3) inside the six nozzles 14 can be increased. As a result, the flow rate of the suction flow 32 sucked into the throat 21 is increased.

As described above, the driving flow 30 flowing into the jet passage 35 is accelerated in the jet passage 35 by the nozzle narrowing portions 16 and 18, and ejected from the ejection outlet 20 into the throat 22 as the jet flow 31. In the present embodiment, the spreading of the jet flow 31 is kept small so that the speed of the jet flow 31 reached inside the throat 22 is higher, reducing the static pressure inside the throat 22. As a result, more suction flow 32 can be sucked into the throat 22.

The present embodiment provides the nozzle 14 having three nozzle narrowing portions 100 16 and 18 so that the flow rate of the suction flow 32 sucked into the throat 22 can be increased, by the above-described working of the nozzle 14, more than the conventional jet pump disclosed in Japanese Patent Laid-open No. Sho 59(1984)-188100 which provides five nozzles, each having one stage of a narrowing portion and a straight-tube portion. For this reason, the flow rate of the cooling water 34 discharged from the jet pump 11 is increased, and the efficiency of the jet pump 11 in a high-M ratio range can be improved more than that of the conventional jet pump.

Figure 7:
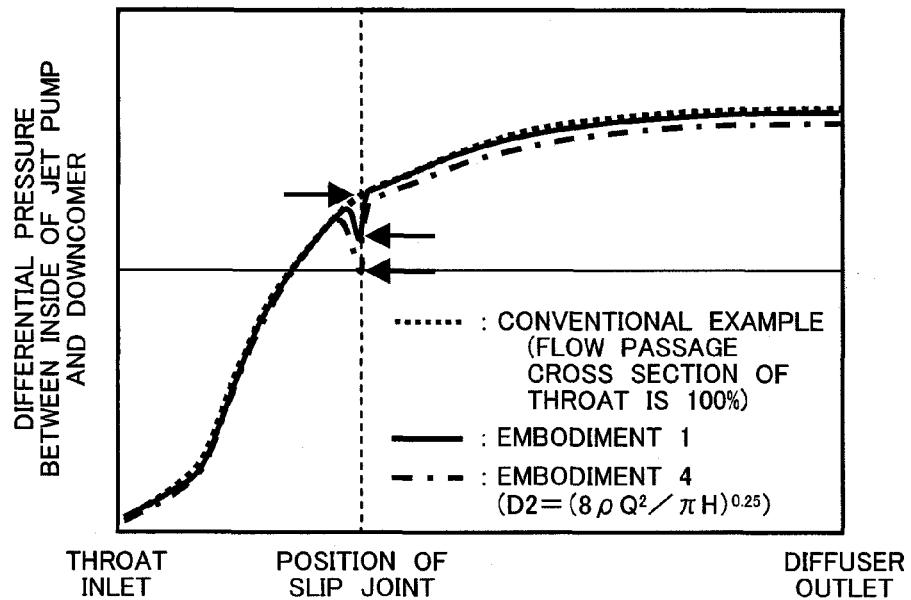
FIG. 7 is an explanatory drawing showing a change in differential pressure between an inside of a jet pump and a downcomer, from a throat inlet to a diffuser outlet of the jet pump.

An example of a change in the differential pressure between the inside of the jet pump and the downcomer 6 in the axial direction of the jet pump from the inlet of the throat to the outlet of the diffuser is shown in FIG. 7. In FIG. 7, the broken line shows a characteristic of a conventional jet pump having five nozzles, which has been used in a boiling water reactor of a million kW class. As shown here, the high-speed ejection of a driving flow from the nozzle causes the static pressure in the throat to be lower than the static pressure in the downcomer 6, making the differential pressure between the inside and the outside of the throat inlet portion negative. The differential pressure between the inside of the jet pump and the downcomer 6 becomes positive at a position of a slip joint, and a magnitude of this positive pressure increases toward the diffuser outlet. In the conventional jet pump, in the lower portion of the throat, the static pressure in the throat is recovered by gradually increasing the flow passage cross-sectional to area toward the downstream end of the throat. When the static pressure in the jet pump at the position of the slip joint is larger than the static pressure in the downcomer 6 at the same location, cooling water starts to leak from the inside of the jet pump to the downcomer 6 through a gap in the slip joint. When the amount of this leakage flow is excessive, the jet pump may vibrate undesirably.

In the slip joint 26 of the jet pump 11 of the present embodiment, as described above, the flow passage reduction portion 23 formed in the downstream end portion of the throat 22 is inserted into the upstream end portion of the diffuser 25 so that the flow speed of the cooling water flowing into the diffuser 25 from the flow passage reduction portion 23 is increased, reducing the static pressure in the diffuser 25 in the vicinity of the downstream end of the flow passage reduction portion 23. This reduces the difference between the static pressure in the jet pump 11, that is, the static pressure in the diffuser 25, and the static pressure in the downcomer 6 at the installation position of the slip joint 26. By using the method that can reduce the difference between these static pressures, the amount of the cooling water leaking to the downcomer 6 through the gap 27 in the slip joint 26 can be reduced more surely than by using the method such as in Japanese Examined Patent Application Publication Sho 59 (1984)-48360 which provides a labyrinth seal whose effect in reducing the leakage flow is limited by an available range of fabrication. Consequently, in the present embodiment, the vibration of the jet pump 11 can be controlled.

The solid line in FIG. 7 shows a change in the differential pressure between the inside of the jet pump 11 and the downcomer 6, when the jet pump 11 in the present embodiment is used, in which jet pump 11, the inner diameter of the downstream end of the throat 22 is made, by forming the flow passage reduction to portion 23, 6% smaller than the inner diameter of the downstream end of the throat in the conventional jet pump having no flow passage reduction portion 23. In the present embodiment, the static pressure starts to decrease at the starting point of the flow passage reduction portion 23, and the differential pressure between the inside of the jet pump 11 and the downcomer 6 at the position of the slip joint 26 drops to about a half of that in the conventional example shown in the broken line. After that, the velocity energy of the cooling water is changed to pressure as the flow passage cross-sectional area in the diffuser 25 is increased, recovering the pressure in the diffuser 25. The drop in the differential pressure between the inside of the jet pump 11 and the downcomer 6 at the position of the slip joint 26 reduces the vibration of the jet pump 11 as described above.

However, the present embodiment increases a pressure loss more than the conventional jet pump because of the formation of the flow passage reduction portion 23. As a result, in the present embodiment shown in the solid line, the pressure at the outlet of the diffuser 25 is lower than that in the conventional example shown in the broken line (see FIG. 7). This reduces the flow rate of the cooling water 34 supplied to the core 2 from the jet pump. In other words, the formation of the flow passage reduction portion 23 reduces the efficiency of the jet pump.

The jet pump 11 of the present embodiment, as described above, tries to improve the efficiency of the jet pump by installing the nozzle apparatus 12 having six nozzles 14 with three stages of nozzle narrowing portions. In the jet pump 11, the reduction in the jet pump efficiency due to the formation of the flow passage reduction portion 23 can be compensated by part of the improvement in the jet pump efficiency achieved by using the nozzle apparatus 12. Thus, the jet pump 11 can prevent the vibration of the jet pump and at the same time, can improve the efficiency of the jet pump more than the conventional jet pump.

Figure 8:
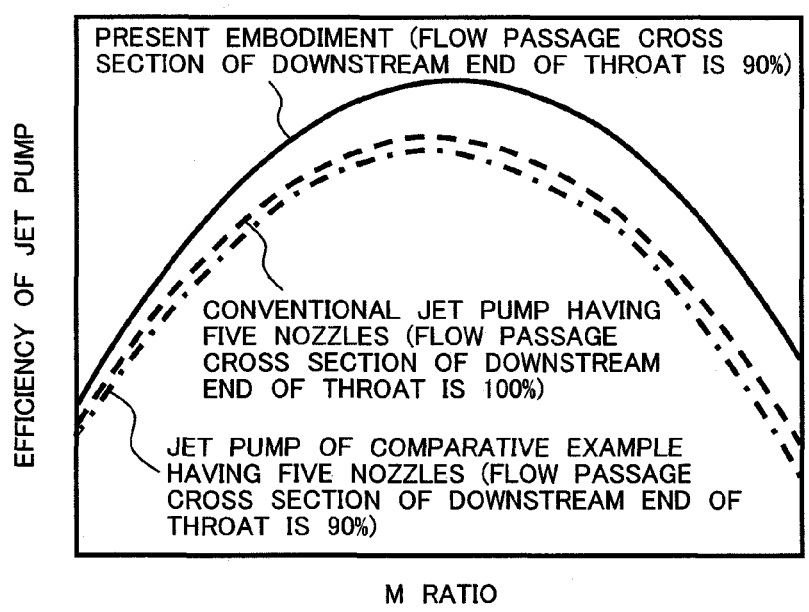
FIG. 8 is a characteristic drawing showing a relationship between the M ratio and the efficiency of a jet pump in embodiment 1.

The improvement in the efficiency of the jet pump of the present embodiment is explained in detail with reference to FIG. 8. In FIG. 8, the broken line shows the efficiency of the conventional jet pump (the conventional jet pump having the characteristic shown by the broken line in FIG. 7) having a nozzle apparatus with five nozzles. In this conventional jet pump, a flow passage cross-sectional area of the downstream end of the throat is set to a conventional ratio of 100%, and each nozzle has one stage of narrowing portion as in the jet pump disclosed in Japanese Patent Laid-open No. Sho 59 (1984)-188100. The alternate long and short dash line in FIG. 8 shows the efficiency of a jet pump of a comparative example, in which the throat in the conventional jet pump having the characteristic shown in the broken line is replaced with a throat having the same flow passage reduction portion 23 as in the present embodiment, in the lower end portion. In the jet pump of the comparative example, a flow passage cross-sectional area of the downstream end of the flow passage reduction portion 23 is 90% of a flow passage cross-sectional area of the corresponding position in the conventional jet pump having the characteristic shown in the broken line. For this jet pump, since the pressure loss is increased by forming the flow passage reduction portion 23 in the throat, the efficiency of the jet pump is lower than that shown in the broken line. The efficiency of the conventional jet pump having the flow passage reduction portion in the throat is reduced by approximately 0.7%.

In FIG. 8, the solid line shows the jet pump efficiency of the jet pump 11 of the present embodiment. In the jet pump 11, a flow passage cross-sectional area of the downstream end of the flow passage reduction portion 23 in the throat 22 is also 90%. In the jet pump 11, the reduction in the jet pump efficiency caused by the formation of the flow passage reduction portion 23 in the throat 22 is covered by the increase in the jet pump efficiency achieved by using the nozzle apparatus 12. As a result, the jet pump efficiency is improved more than the jet pump efficiency of the jet pump of the conventional example shown in the broken line. In the present embodiment, the efficiency of the jet pump is improved by approximately 3% more at the peak compared to that of the conventional jet pump without the flow passage reduction portion in the throat.

In the jet pump 11 of the present embodiment, the number of the nozzles 14 is increased to six. By using three stages of the nozzle narrowing portions 100 16 and 18, as illustrated in FIG. 3, the spreading of the jet flow 31 ejected from the ejection outlet 20 can be kept small, suppressing the reduction in the speed of the jet flow 31 that has reached the inlet of the throat 22 as well as the decrease in the suction area for the suction flow 32 in the throat 22. This allows more suction flow 32 to be sucked into the throat 22 at the same ejecting speed of the jet flow 31. In addition, in the present embodiment, the total flow passage cross-sectional area of the ejection outlets 20 of the six nozzles 14 is made the same as that of the conventional five nozzles, while making the total length of wetted perimeter of the six nozzles 14 approximately 9% more than that of the conventional five nozzles. This increases the contact area between the suction flow 32 and the jet flow 31 of the driving flow 30 ejected from the ejection outlet 20, making both fluids to be mixed faster, which reduces a loss during the mixing.

The jet pump 11 of the present embodiment can improve the jet pump efficiency compared to the conventional jet pump disclosed in Japanese Patent Laid-open No. Sho 59 (1984)-188100 which provides five nozzles, each having one stage of a narrowing portion and a straight-tube portion.

In the present embodiment, since the narrowing angle θ2 of the nozzle narrowing portion 18 is made larger than the narrowing angle θ1 of the nozzle narrowing portion 16, the spread of the jet flow 31 is suppressed and which prevents the reduction in the speed of the driving flow 30 at the inlet of the throat 22 is also suppressed. At the same time, since the nozzle lower end portion 19 forming the ejection outlet 20 is provided, it can be prevented to accelerate excessively the driving flow 30 by the narrowing portion and to increase the pressure loss in the nozzle 14.

Since the speed of the driving flow 30 in the throat 22 is not much slower than the speed at the ejection outlet 20, the static pressure in the throat 22 is reduced and the suction amount of the suction flow 32 into the throat 22 is increased. Consequently, the M ratio and the efficiency of the jet pump can be improved.

In a boiling water reactor, a rotational speed of the recirculation pump 8 is controlled to adjust a flow rate of cooling water supplied to the core 2 (a core flow rate). The improvement in the M ratio and the jet pump efficiency allows the core flow rate to be increased using less power from the recirculation pump. Thus, power consumption for driving the recirculation pump 8 can be reduced. In addition, when a power upgrade of a reactor in the U.S. is to be implemented, the core flow rate can be further increased without increasing the capacity of the recirculation pump 8 by employing, for the existing reactor, the jet pump 11 of to the present embodiment which can increase the M ratio and the jet pump efficiency. For this reason, the power upgrade of the boiling water reactor can be easily achieved.

[Embodiment 2]

A jet pump according to embodiment 2, which is another embodiment of the present invention, is described below. The jet pump is also applied to a boiling water reactor. A jet pump 11A of the present embodiment has a structure in which the nozzle apparatus 12 in the jet pump 11 of the embodiment 1 is replaced with a nozzle apparatus 12A. Other components of the jet pump 11A are the same as the jet pump 11. The nozzle apparatus 12A is explained below with reference to FIGS. 9 and 10.

In the jet pump 11A, minimizing the loss in pressure and making the most of the suction power induced by a driving flow are both important to increase the M ratio and the N ratio and to raise the efficiency of the jet pump. The jet pump 11A of the present embodiment has an inner cooling water suction passage 50 in and through the nozzle apparatus 12A in the axial direction. The inner cooling water suction passage 50 has, in its upper end, an opening 51 which communicates with the downcomer 6. Furthermore, in the jet pump 11A, the inner cooling water suction passage 50 extends upward inside the elbow pipe 10, and the opening 51 is formed on the outer surface of the elbow pipe 10 at a position lower than a top point TP of the elbow pipe 10.

Figure 9:
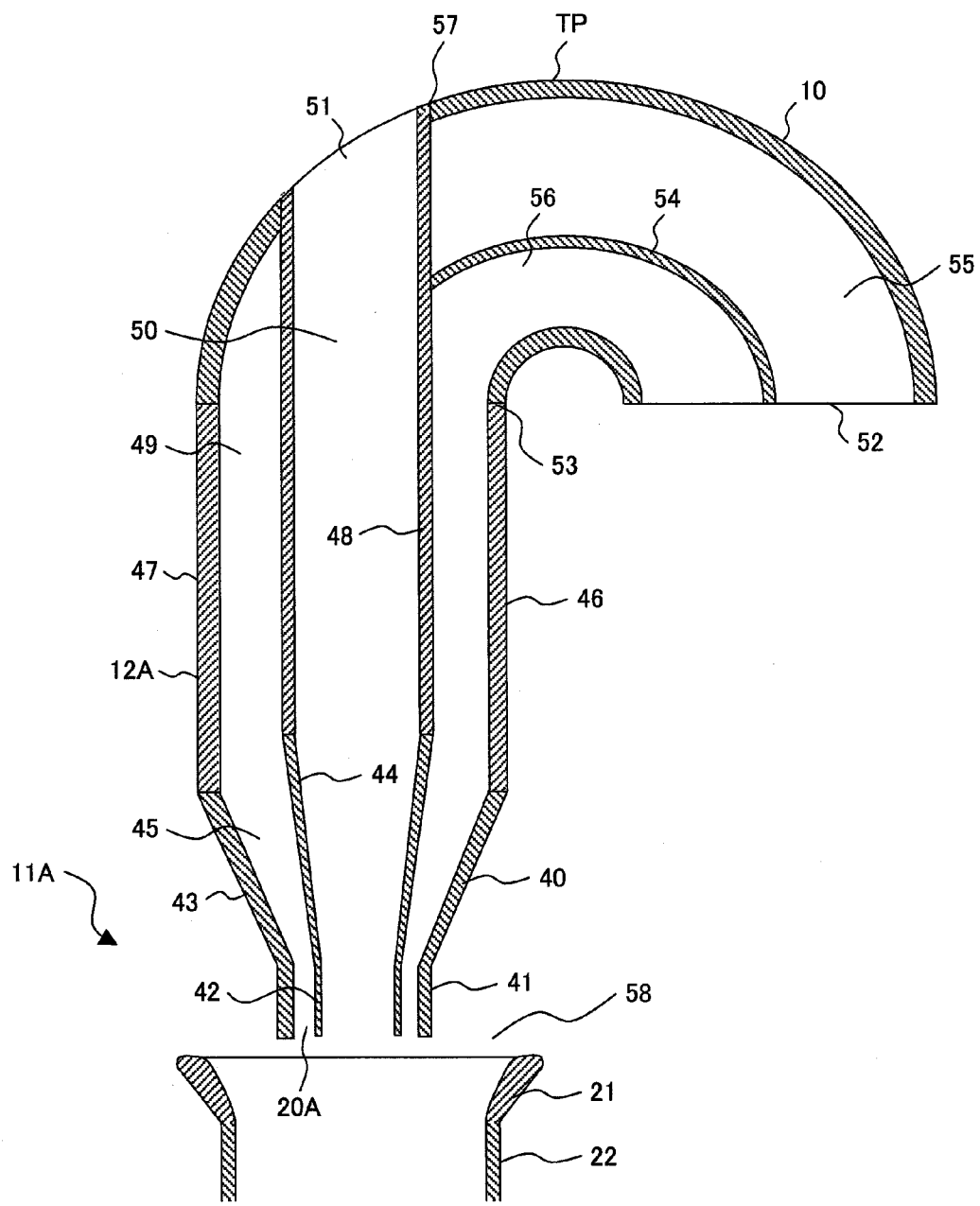
FIG. 9 is a longitudinal sectional view showing a nozzle apparatus in a jet pump according to embodiment 2 applied to a boiling water reactor, which is another embodiment of the present invention.
Figure 10:
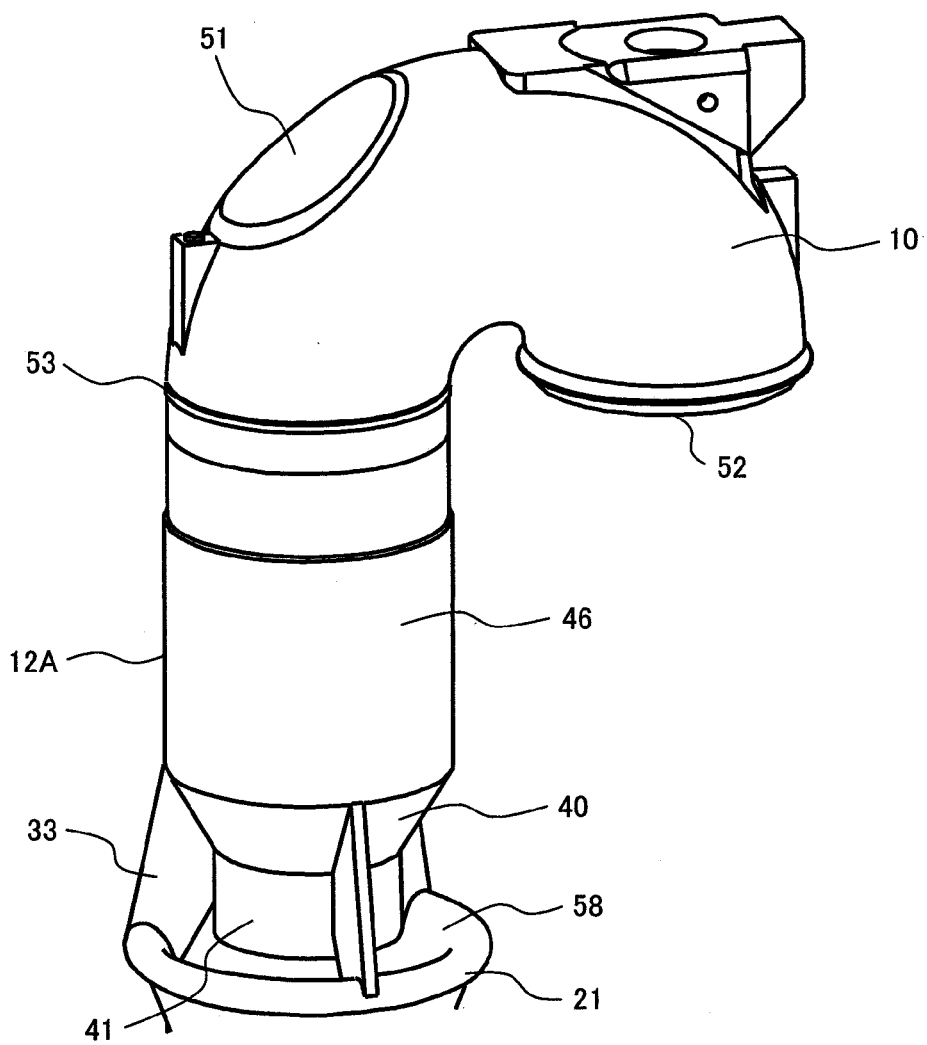
FIG. 10 is a perspective view showing a nozzle apparatus shown in FIG. 9.

The nozzle apparatus 12A, as shown in FIG. 9, has a nozzle portion 40 and a nozzle header portion 46. The nozzle header portion 46 has an outer cylinder member 47 and an inner cylinder member 48 disposed inside the outer cylinder member 47. An annular header portion 49 is formed between the outer cylinder member 47 and the inner cylinder member 48, both of which are disposed in a concentric manner. The nozzle portion 40 is disposed below the nozzle header portion 46, and fixed to a lower end portion of the nozzle header portion 46.

The nozzle portion 40 has an outer cylinder member 41, an inner cylinder member 42, an outer funnel member 43, and an inner funnel member 44. The outer cylinder member 41 surrounds the inner cylinder member 42, and the outer cylinder member 41 and the inner cylinder member 42 are concentrically disposed. The outer funnel member 43 surrounds the inner funnel member 44, and the outer funnel member 43 and the inner funnel member 44 are concentrically disposed. The outer funnel member 43 and the inner funnel member 44 each have a cross-sectional area that decreases downward. The outer funnel member 43 is fixed to an upper end of the outer cylinder member 41, and the inner funnel member 44 is fixed to an upper end of the inner cylinder member 42. The outer funnel member 43 is attached to a lower end of the outer cylinder member 47. The inner funnel member 44 is attached to a lower end of the inner cylinder member 48. An annular ejection outlet 20A is formed between the outer cylinder member 41 and the inner cylinder member 42.

An outlet end 53 of the elbow pipe 10 is fixed to the nozzle header portion 46, that is, an upper end of the outer cylinder member 47. An inlet end 52 of the elbow pipe 10 is placed on an upper end of the branching pipe 60. The elbow pipe 10 and the branching pipe 60 are detachably coupled with a fixture. The center of the outlet end 53 of the elbow pipe 10 matches an axis of the nozzle header portion 46, that is, the outer cylinder member 47. The nozzle portion 40, the nozzle header portion 46, and the elbow pipe 10 are joined into one body by welding.

The inner cylinder member 48 is inserted into the elbow pipe 10 through the outlet end 53, and extends upward. The opening 51 located in the upper end portion of the inner cylinder member 48 is formed on the outer surface of the elbow pipe 10 and communicates with the downcomer 6. The upper end of the inner cylinder member 48 is welded to the elbow pipe 10. A joint (a fixed position) 57 which is the highest position in a joint portion (a fixed portion) between the inner cylinder member 48 and the elbow pipe 10 is disposed lower than the top point TP which is the highest position on the outer surface of the elbow pipe 10. A flow-adjusting plate (a flow-adjusting member) 54 having the same curvature as the elbow pipe 10 is installed inside the elbow pipe 10, and disposed from the inlet end 52 of the elbow pipe 10 to the inner cylinder member 48 along the axis of the elbow pipe 10. The flow-adjusting plate 54 is disposed upstream from the inner cylinder member 48. An upper passage 55 and a lower passage 56 that are separated into the top and the bottom, are formed in the elbow pipe 10 by the installation of the flow-adjusting plate 54. Since the joint 57 is located lower than the top point TP, the upper flow passage 55 and the lower passage 56 in the elbow pipe 10 extending toward the outlet end 53 are formed diagonally to the axis of the inner cylinder member 48. In other words, the upper passage 55 and the lower passage 56 are formed so that the driving flows in the flow passages flowing toward the outlet end 53, hitting the inner cylinder member 48 diagonally in relation to the axial direction of the inner cylinder member 48.

The inner cooling water suction passage 50 communicating with the downcomer 6 through the opening 51 is formed inside the joined inner cylinder member 48, inner funnel member 44, and inner cylinder member 42. The joined inner cylinder member 48, inner funnel member 44, and inner cylinder member 42 are a first pipe member. The inner cooling water suction passage 50 has a flow passage cross-sectional area which gradually decreases downward in the inner funnel member 44, and its lower end opens toward the bell mouth 21. An annular passage 45 formed between the outer funnel member 43 and the inner funnel member 44, communicating with the annular header portion (an annular passage) 49 and the annular ejection outlet 20A, has a flow passage cross-sectional area which gradually decreases downward.

The driving flow pressurized by the recirculation pump 8 during the operation of the boiling water reactor reaches the raiser pipe 9 and is introduced into the annular header portion 49 through the elbow pipe 10. The flow-adjusting plate 54 disposed in the elbow pipe 10 reduces the pressure loss in the elbow pipe 10. Part of the driving flow flowing in each of the upper passage 55 and the lower passage 56 in the elbow pipe 10 toward the outlet end 53 hits the outer surface of the inner cylinder member 48 diagonally in relation to the axial direction of the first pipe member (the inner cylinder member 48 in particular). The driving flow introduced into the annular header portion 49 flows through the annular passage 45 and is ejected at high speed into the bell mouth 21 from the annular ejection outlet 20A. The cross-sectional area of the jet flow of the driving flow ejected from the annular ejection outlet 20A is annular. The high-speed supplying of the jet flow of the driving flow into the throat 22 reduces the static pressure in the throat 22, making the cooling water around the nozzle apparatus 12A in the downcomer 6 to be sucked into the bell mouth 21.

There are two patterns for the cooling water being the suction flow around the nozzle apparatus 12A to be sucked into the bell mouth 21 due to the reduction in the static pressure in the throat 22. The first pattern is that the cooling water above the elbow pipe 10 flows into the inner cooling water suction passage 50 from the opening 51, and reaches the bell mouth 21 through the inner cooling water suction passage 50. In this pattern, the cooling water sucked through the inner cooling water suction passage 50 flows into the inside of the annular jet flow ejected from the annular ejection outlet 20A. The second pattern is that the cooling water in the downcomer 6 passes through an outer cooling water suction passage 58 formed between the nozzle portion 40 and the bell mouth 21, and reaches the bell mouth 21 at the outside of the annular jet flow.

The driving flow ejected from the annular ejection outlet 20A and the cooling water (the suction flow) sucked into the bell mouth 21 by the working of the driving flow are mixed in the throat 22 by exchanging their momentum, and introduced to the diffuser 25 located below the throat 22. The cooling water 34 discharged from the diffuser 25 is introduced to the core 2 through the lower plenum 29.

In the present embodiment, since the joint portion 57 is positioned lower than the top point TP, the upper passage 55 and the lower passage 565 in the elbow pipe 10 are formed toward the outlet end 53, diagonally to the inner cylinder member 48 forming the inner cooling water suction passage 50 in the axial direction of the inner cylinder member 48. For this reason, the pressure loss in the elbow pipe 10 where the inner cylinder member 48 exists is reduced, and the flow speed of the cooling water ejected from the annular ejection outlet 20A is increased. The reduction amount of the static pressure in the throat 22 is increased, increasing the flow rate of the cooling water sucked into the bell mouth 21 through the inner cooling water suction passage 50 and the outer cooling water suction passage 58. This increase in the flow rate of the cooling water improves the efficiency of the jet pump 11A.

Figure 11:
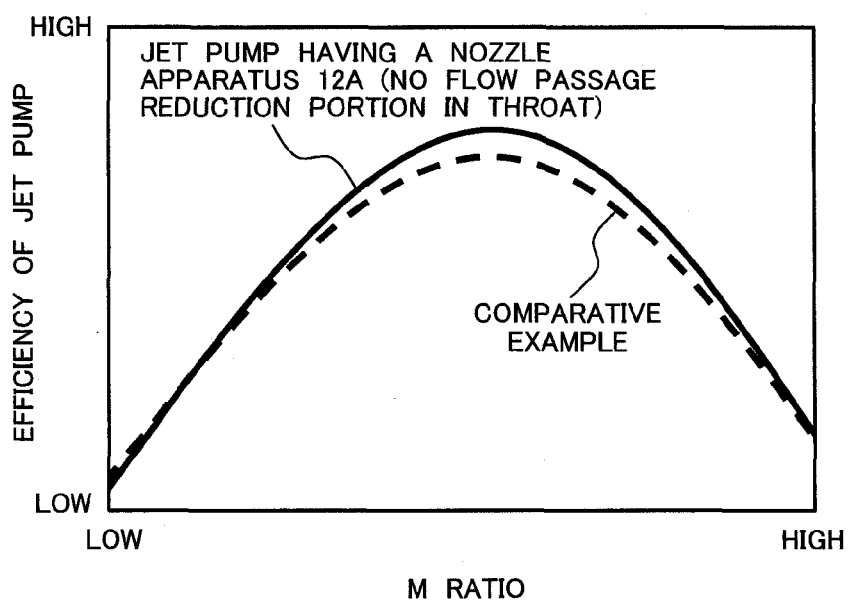
FIG. 11 is a characteristic drawing showing a relationship between the M ratio and the efficiency of a jet pump.

This improvement in the efficiency of the jet pump 11A is explained. FIG. 11 shows a relationship between the M ratio and the jet pump efficiency of a jet pump having the nozzle apparatus 12A with no flow passage reduction portion in the throat, and that of a jet pump of a comparative example. In FIG. 11, the solid line shows a characteristic of the jet pump having the nozzle apparatus 12A with no flow passage reduction portion in the throat, and the broken line shows a characteristic of the comparative jet pump. The jet pump of the comparative example uses the nozzle apparatus shown in FIG. 3 of Japanese Patent Laid-open No. 2001-90700 as a nozzle for the jet pump in a BWR, disclosed in U.S. Pat. No. 3,625,820. While in the comparative example, a pressurized driving flow hits an inner cylinder of the nozzle apparatus at a right angle, in the jet pump having the nozzle apparatus 12A with no flow passage reduction portion in the throat, a driving flow flowing through a cooling water passage in the elbow pipe 10 hits the inner cylinder member 48 diagonally as described above. Because of such a difference in the driving flows, the pressure loss of the jet pump having the nozzle apparatus 12A with no flow passage reduction portion in the throat is less than that of the comparative example. Consequently, in the jet pump having the nozzle apparatus 12A with no flow passage reduction portion in the throat, the efficiency of the jet pump is increased by more than that of the comparative example for the amount of the reduced pressure loss in the nozzle.

Since the jet pump 11A of the present embodiment has the flow passage reduction portion 23 in the lower end portion of the throat 22 in the same manner as the jet pump 11 of the embodiment 1, in the jet pump 11A, the flow passage reduction portion 23 causes the efficiency of the jet pump to decrease. However, this reduction in the efficiency can be compensated for by part of the increase in the efficiency achieved by the nozzle apparatus 12A. From the contribution of the remaining increase in the efficiency achieved by the nozzle apparatus 12A, the jet pump 11A, thus, can improve the efficiency of the jet pump more than that of the comparative example.

In the present embodiment, a leakage flow from the gap 27 in the slip joint 26 can be reduced because the flow passage reduction portion 23 is formed in the lower end portion of the throat 22. For this reason, the vibration of the jet pump 11A can be suppressed.

In the present embodiment, since the flow-adjusting plate 54 is installed in the elbow pipe 10, the pressure loss in the elbow pipe 10 can be further reduced. The reduction in the pressure loss further increases the efficiency of the jet pump 11A. Since the flow-adjusting plate 54 is disposed upstream from the inner cylinder member 48, separation of the flow and uneven distribution of speed in the elbow pipe 10 are improved, and the pressure loss in the elbow pipe 10 is reduced.

Since the cooling water passages (the upper passage 55 and the lower passage 56) formed in the elbow pipe 10 are diagonal to the inner cylinder member 48 as described above, the driving flow flowing in the cooling water passages hits the outer surface of the inner cylinder member 48 diagonally to the axial direction of the inner cylinder member 48. This causes the stress generated at the contact portion between the inner cylinder member 48 and the elbow pipe 10 to be small. Thus, when the nozzle apparatus 12A is applied to a current BWR, it is not necessary to reinforce the joint portion by making the member particularly thick, or to modify the raiser pipe 9 and the fixture.

In the present embodiment, Since the inner cooling water suction passage 50 is formed in the nozzle apparatus 12A, the effect of the pressure reduction in the area inside the ejected annular jet flow can be effectively used. This generates the flow of the cooling water reaching into the bell mouth 21 through the inner cooling water suction passage 50. Thus, since cooling water can flow into the bell mouth 21 through each of the inner cooling water suction passage 50 and the outer cooling water suction passage 58, the flow rate of the cooling water flowing into the bell mouth 21 is increased.

The inner cooling water suction passage 50 is disposed in the axial direction of the RPV 1, and the opening 51 opens upward, so that the flow power of the cooling water descending in the downcomer 6, supplied to the inner cooling water suction passage 50, can be effectively utilized to increase the suction power of the jet pump 11A. This increases the rate of the cooling water sucked into the throat 22. In addition, since the nozzle portion 40 has the outer funnel member 43 whose outer diameter decreases downward, the nozzle apparatus 12A has a structure that allows the cooling water descending in the downcomer 6 to be easily sucked into the bell mouth 21 through the outer cooling water suction passage 58. This also increases the flow rate of the cooling water flowing into the bell mouth 21, increasing the efficiency of the jet pump 11A.

In the boiling water reactor installed with the jet pump 11A, the core flow rate can be further increased without increasing the capacity of the recirculation pump 8 in the same manner as in the embodiment 1. For this reason, a power upgrade of the boiling water reactor can be easily achieved.

Furthermore, in the present embodiment, the inverted U-shaped elbow pipe 10 is connected to the nozzle apparatus 12A so that a single raiser pipe 9 disposed in the downcomer 6 can be connected to two jet pumps 11A adjacent to the raiser pipe 9, with the elbow pipes 10 each connected to the nozzle apparatus 12A of each of the two jet pumps 11A. For this reason, a space between the jet pumps 11A can be made equal to the corresponding space in the existing boiling water reactor.

[Embodiment 3]

A jet pump according to embodiment 3, which is another embodiment of the present invention, is described below. A jet pump 11B of the present embodiment has a structure in which the nozzle apparatus 12 in the jet pump 11 in the embodiment 1 is replaced with a nozzle apparatus 12B. Other components of the jet pump 11B are the same as the jet pump 11. The nozzle apparatus 12B is explained below with reference to FIG. 12.

Figure 12:
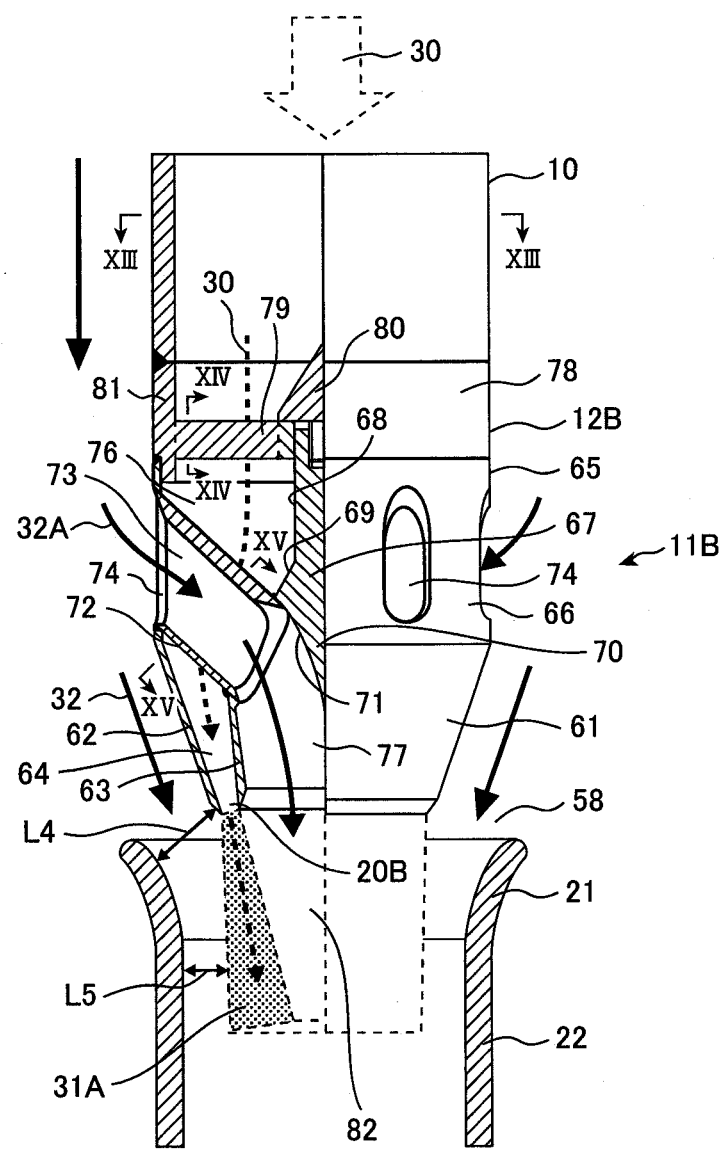
FIG. 12 is a longitudinal sectional view showing a nozzle apparatus in a jet pump according to embodiment 3 applied to a boiling water reactor, which is another embodiment of the present invention.

The nozzle apparatus 12B, as shown in FIG. 12, has a nozzle portion 61, a suction passage portion 65, and a nozzle holder 78. The suction passage portion 65 is disposed above the nozzle portion 61, and installed on the upper end of the nozzle portion 61. The nozzle holder 78 is disposed above the suction passage portion 65 and installed on an upper end of the suction passage portion 65.

Figure 13:
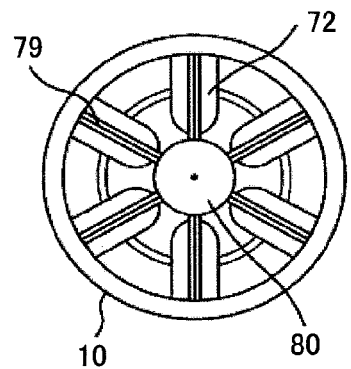
FIG. 13 is a sectional view taken along XIII-XIII of FIG. 12.
Figure 15:
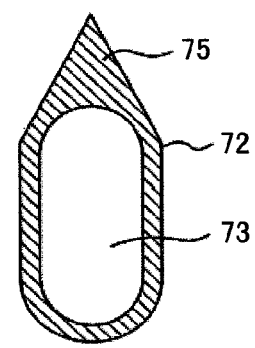
FIG. 15 is a sectional view taken along XV-XV of FIG. 12.

The suction passage portion 65 has a cylinder member (a third tubular member) 66, a flow passage forming member 67, and a passage member 72. The flow passage forming member 67 is disposed inside the cylinder member 66 in the center of the cylinder member 66. Six passage members 72 are disposed radially around the central axis of the cylinder member 66, 60 degrees apart from each other in the circumferential direction (see FIG. 13). The outer end portion of the passage member 72 is welded to the cylinder member 66, and the inner end portion of the passage member 72 is welded to the flow passage forming member 67. Each passage member 72 slopes downward and inward (toward the flow passage forming member 67), and has an oval cross-sectional area (see FIG. 15). An opening 74 is formed in the outer end portion of the passage member 72. An annular driving flow passage 76 is formed between the cylinder member 66 and the flow passage forming member 67. Each passage member 72 is placed across this driving flow passage 76. A suction passage 73 communicating with the downcomer 6 through the opening 74 is formed in each passage member 72. The inner surfaces of each passage member 72 at the inlet and the outlet of each suction passage 73 are curved surfaces. The total flow passage cross-sectional area of all the suction passages 73 is larger than the cross-sectional area of a decompression chamber (an inner region) 77 at the lower end of the nozzle portion 61. Each passage member 72 is provided with a streamline member 75 (see FIG. 15) having a cross-sectional area that decreases toward the upper course to reduce the pressure loss in the driving flow passage 76.

The flow passage forming member 67 has a circular cross section at any point in the axial direction, and includes an upper region 68, a center region 69, and a lower region 70, each having a different cross-sectional area in the axial direction. The upper region 68 is cylindrical, and the center region 69 connected to a lower end of the upper region 68 is a truncated cone. The lower region 70 connected to a lower end of the center region 69 is an inverted cone. The center region 69 has a cross-sectional area that increases downward. This reduces a cross-sectional area of the driving flow passage 76 downward between the cylinder member 66 and the outer surface of the center region 69. The lower region 70 has a cross-sectional area that decreases downward, and has a curved surface 71 whose outer surface comes together in the axial direction.

The nozzle portion 61 has an outer cylinder member (a first tubular member) 62 and an inner cylinder member (a second tubular member) 63 disposed in the outer cylinder member 62. The outer cylinder member 62 is welded to a lower end of the cylinder member 66, and an upper end of the inner cylinder member 63 is welded to the flow passage forming member 67. The outer cylinder member 62 has an outer diameter that is smaller in the lower end than in the upper end, and slopes inward. The inner cylinder member 63 has an outer diameter that becomes the largest in a center portion and smaller in the upper and a lower ends. An inner end portion of the passage member 72 is welded to the upper portion rather than the center portion of the inner cylinder member 63. Therefore, the inner cylinder member 63 exists between the adjacent passage members 72 in the circumferential direction of the inner cylinder member 63. An annular jet passage 64 is formed between the outer cylinder member 62 and the inner cylinder member 63. The annular jet passage 64 slopes inward, and has a flow passage cross-sectional area that becomes smaller downward. The jet passage 64 communicates with the driving flow passage 76. The jet passage 64 is also a part of the driving flow passage. An annular ejection outlet 20B is formed at the end of the jet passage 64. The decompression chamber 77 is formed in the inner cylinder member 63, and the suction passage 73 communicates with the decompression chamber 77. The curved surface 71 of the lower region 70 of the flow passage forming member 67 faces the decompression chamber 77. The inner cylinder member 63 separates the driving flow passage 76 and the decompression chamber 77.

Figure 14:
FIG. 14 is a sectional view taken along XIV-XIV of FIG. 12.

The nozzle holder 78 has a cylinder member 81, a reinforcing streamline plate 79, and a cone member 80. The cylinder member 81 is fixed to the upper end of the cylinder member 66 of the suction passage portion 65. The cone member 80 has a cross-sectional area that decreases upward, and disposed in the center of the cylinder member 81. Six reinforcing streamline plates (see FIG. 14) 79 are radially disposed around the central axis of the cylinder member 81, 60 degrees apart from each other in the circumferential direction, and disposed in the positions above the passage members 72 (see FIG. 13). The both ends of each reinforcing streamline plate 79 are fixed to the cylinder member 81 and the cone member 80. A lower end portion of the cone member 80 is fitted to the upper end portion of the flow passage forming member 67. An upper end of the cylinder member 81 is connected to the elbow pipe 10.

It can be said that when the nozzle portion 61 and the suction passage portion 65 are unified, the outer cylinder member 62 and the cylinder member 66 make up the first tubular member and the inner cylinder member 63 is the second tubular member. Between these first and second tubular members, the driving flow passage including the jet passage 64 is formed.

The driving flow 30 pressurized by the recirculation pump 8 during the operation of the boiling water reactor flows into the cylinder member 81 through the elbow pipe 10, and further reach the jet passage 64 through the driving flow passage 76. This driving flow 30 is ejected as a jet flow 31A into the bell mouth 21 from the ejection outlet 20B located at the end of the jet passage 64. The working of the jet flow 31A makes the suction flow 32, which is part of the cooling water around the nozzle apparatus 12B in the downcomer 6, to flow into the bell mouth 21 through the cooling water suction passage 58. This suction flow 32 is introduced into the throat 22 through the space between the bell mouth 21 and the jet flow 31A.

Since the jet passage 64 is sloped, the jet flow 31A is ejected diagonally toward the central axis of the throat 22 from the ejection outlet 20B. Consequently, the working of the jet flow 31A makes the pressure in the decompression chamber 77 negative, so that the suction flow 32A, which is part of the cooling water descending in the downcomer 6, flows into the suction passage 73 to reach the decompression chamber 77. This suction flow 32A further flows into a decompression region 82 formed inside the jet flow 31A in the bell mouth 21.

Figure 2:
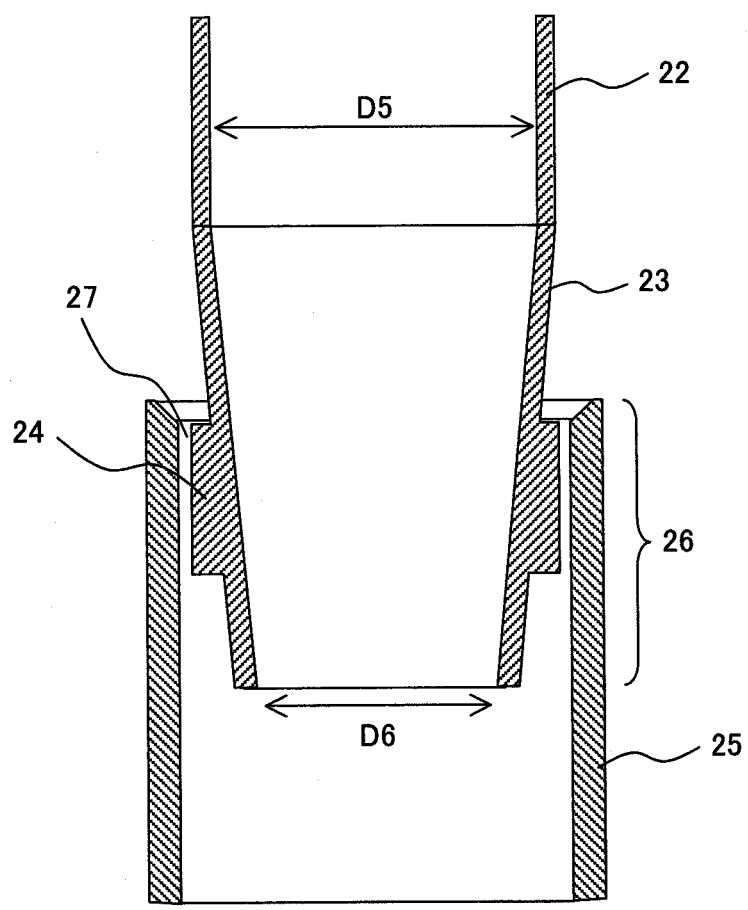
FIG. 2 is an enlarged longitudinal sectional view showing a slip joint shown in FIG. 1.
Figure 4:
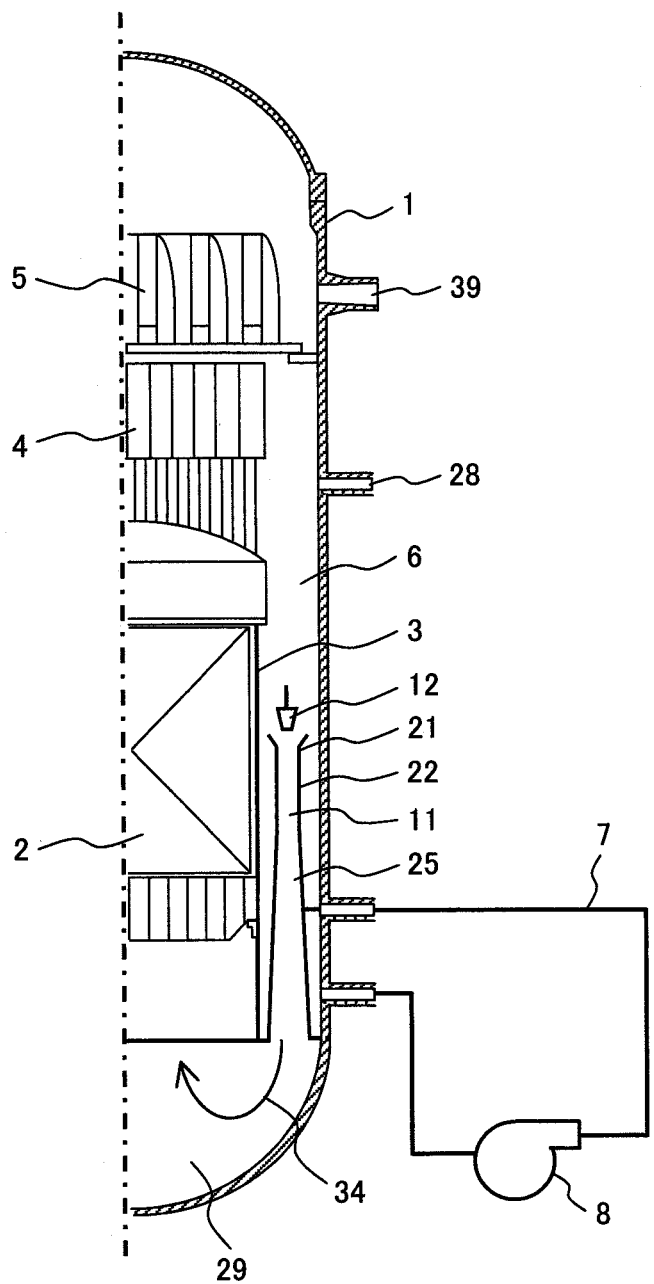
FIG. 4 is a longitudinal sectional view showing a boiling water reactor to which the jet pump shown in FIG. 1 is applied.

The suction flows 32 and 32A and the driving flow 30 flowing into the bell mouth 21 are mixed in the throat 22 and discharged from the diffuser 25 (see FIGS. 1 and 4). These flows, that is, the cooling water 34, discharged from the diffuser 25 is supplied to the core 2.

The jet pump 11B in the present embodiment as described above has the following unique structures (a) to (c).

(a) The jet passage 64 in the nozzle portion 61 slopes inward.

(b) The suction passage 73 slopes inward.

(c) A cross section of the passage member 72 forming the suction passage 73 is oval.

Various effects obtained by the unique structures (a) to (c) are explained in detail. First of all, various effects obtained by the unique structure (a) are described. The jet passage 64 in the nozzle portion 61 slopes inward. That is, the jet passage 64 slopes inward and downward toward the central axis of the throat 22. As a consequence, the jet flow 31A ejected from the ejection outlet 20B is ejected downward toward the central axis of the throat 22. Such jet flow 31A reduces the volume of the inverted cone-shaped decompression region 82 formed inside the jet flow 31A below the flow passage forming member 67. The reduction in the volume of the decompression region 82 relatively increases the degree of the pressure reduction, increasing the degree of negative pressure in the decompression chamber 77. As a result, a flow rate Qb2 of the suction flow 32A sucked into the bell mouth 21 through the suction passage 73 is increased.

In addition, in the present embodiment, since the jet passage 64 in the nozzle portion 61 slopes inward, a distance L4 between the bell mouth 21 and the end of the outer cylinder member 62 of the nozzle portion 61 can be larger. As a result, a distance L5 between the inner surface of the throat 22 and the jet flow 31A is increased, increasing a flow rate Qb1 of the suction flow 32 flowing into the space between the bell mouth 21 and the jet flow 31A through the cooling water suction passage 58.

An increase in the flow rate Qb1 of the suction flow 32 and the flow rate Qb2 of the suction flow 32A increases the flow rate of the cooling water 34 discharged from the diffuser 25. That is, the efficiency of the jet pump 11B is further improved.

Various effects obtained by the unique structure (b) are described. Since the suction passage 73 slopes inward, the cooling water descending in the downcomer 6 can flow into the suction passage 73 by only slightly changing its flow direction. This makes the suction flow 32A to be easily sucked into the suction passage 73. In addition, since the suction passage 73 slopes inward, the downward flow force (a flow speed of approximately 2 m/s) of the cooling water in the downcomer 6 can be effectively used, allowing the suction flow 32A to be easily sucked into the suction passage 73. These workings further increase the flow rate Qb2 of the suction flow 32A, further increasing the flow rate of the cooling water 34 as well.

Various effects obtained by the unique structure (c) are described. Since a cross section of the passage member 72 forming the suction passage 73 is oval, the cross-sectional area of the suction passage 73 can be enlarged. Consequently, the pressure loss in the suction passage 73 can be reduced and the flow rate Qb2 of the suction flow 32A can be increased. In particular, since the passage members 72 are disposed in such a way that their major axes follow the axial direction of the nozzle apparatus 12B and their minor axes follow the circumferential direction of the nozzle apparatus 12B, the pressure loss in the suction flow passage 76 can be reduced and the cross-sectional area of the suction passage 73 can be enlarged. In addition, such an arrangement with respect to the major and minor axes allows the number of the passage members 72 disposed in the circumferential direction of the nozzle apparatus 12B to be increased. Consequently, the total flow passage cross-sectional area of all the suction passages 73 can be enlarged. This greatly contributes to the increase in the flow rate Qb2 of the suction flow 32A.

Besides the unique structures (a) to (c), the nozzle apparatus 12B has some other structures that allow the yielding of new effects. These effects are described. In order to reduce the pressure loss in a flow passage for the driving flow 30, the nozzle apparatus 12B adapts some ideas. A structure for reducing the pressure loss, other than the structure in which the cross section of the passage member 72 is oval, is explained. Each passage member 72 forms, in the upstream side, a streamline member 75 having a cross section that decreases toward the upper course (see FIG. 15). The formation of this streamline member 75 reduces turbulence in the driving flow 30 flowing in the driving flow passage 76, reducing the pressure loss in the driving flow passage 76. The reinforcing streamline plate 79 also has a streamline shape whose cross section decreases toward the upper course (see FIG. 14). This structure reduces the pressure loss in the driving flow passage 76. Furthermore, since each reinforcing streamline plate 79 is disposed to the same position above the passage member 72 located downstream in the circumferential direction of the nozzle apparatus 12B, the pressure loss in the driving flow passage 76 is reduced. Since the flow passage cross-sectional area of the jet passage 64 gradually decreases from the upper course to the ejection outlet 20B, the pressure loss in the jet passage 64 is also reduced. The cone member 80 having a cross-sectional area that increases from the upper course to the lower course, is disposed on the upper end of the flow passage forming member 67, so that the driving flow 30 flowing in the elbow pipe 10 can be smoothly introduced to the annular driving flow passage 76. This reduces the pressure loss in the flow passage for the driving flow 30 in the nozzle apparatus 12B. Furthermore, in the present embodiment, the pressure loss in the nozzle apparatus 12B can be further reduced because the nozzle apparatus 12B forms no flow passage such as the one in the nozzle apparatus shown in FIG. 1 of Japanese Patent Laid-open No. 2008-82752, in which the flow passage turns the driving flow at a right angle.

The nozzle apparatus 12B employs some ideas for reducing the pressure loss in the flow passage for the suction flow 32A. This reduction in the pressure loss is obtained by forming curved surfaces on the inlet and the outlet of the passage member 72 as described above. Since the total flow passage cross-sectional area of all the suction passages 73 is larger than the cross-sectional area of the decompression chamber 77 at the lower end of the nozzle portion 61, the pressure loss in the flow passage for the suction flow 32A formed in the nozzle apparatus 12B is reduced. Since the cross section of the passage member 72 is oval and this passage member 72 is disposed in such a way that it slopes downward toward the axial direction of the nozzle apparatus 12B, the opening area of the inlet of the suction passage 73 can be enlarged. This also decreases the pressure loss in the suction passage 73. Since the surface of the lower region 70 of the flow passage forming member 67, facing the decompression chamber 77, is the curved surface 71, the driving flow 32A discharged from the suction passage 73 can smoothly change the direction downward along the curved surface 71 in the decompression chamber 77. By forming the curved surface 71 functioning in this way, the pressure loss in the flow passage for the suction flow 32A, formed in the nozzle apparatus 12B, can be reduced as well.

The lower region 70 of the flow passage forming member 67 protrudes below an upper end of the outlet side of the passage member 72. Adapting such a shape allows the negative pressure in the decompression chamber 77, which is increased by the unique structure of (a), to effectively act on the suction passage 73, and allows the flow rate Qb2 of the suction flow 32A flowing into the suction passage 72 to be increased. In other words, the lower region 70 prevents the formation of a decompression dead water region in the decompression chamber 77 by the suction flow 32A discharged from the suction passage 73. The lower region 70 is disposed in the area where the decompression dead water region is to be formed in the decompression chamber 77 when no lower region 70 is provided. For this reason, cavitation induced in the decompression dead water region is prevented from occurring, and the flow rate Qb2 of the suction flow 32A can be increased.

In the present embodiment, the ejection outlet 20B is annular, making the jet flow 31A ejected from the ejection outlet 20B also annular. Thus, since a vortex generated by the jet flow 31A is evenly distributed in the circumferential direction, a random vortex formation that causes flow-induced vibration is prevented and consequently, the vibration of structures in the boiling water reactor can be prevented.

Since the nozzle apparatus 12B has an annular flow passage for the driving flow 30, the ejection outlet 20B, and the suction passages 73 crossing the flow passage for the driving flow 30, for introducing the suction flow 32A, the nozzle apparatus 12B can be made compact. Therefore, by replacing a nozzle in a conventional jet pump to the nozzle apparatus 12B, the jet pump can be quickly and easily converted into the jet pump 11B having a higher nozzle efficiency.

Figure 16:
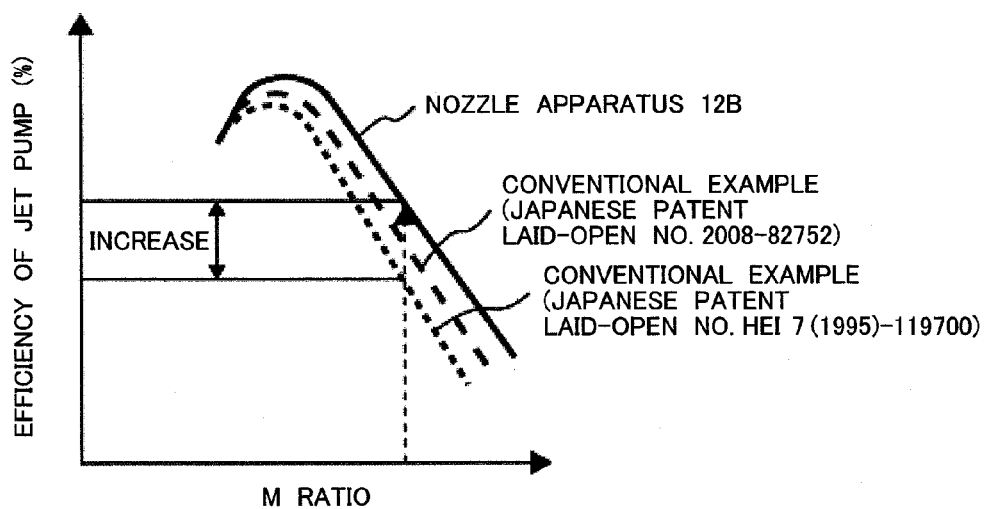
FIG. 16 is a characteristic drawing showing a relationship between the M ratio and the efficiency of a jet pump.

A characteristic of the jet pump having the nozzle apparatus 12B with no flow passage reduction portion in the throat is compared with the characteristics of the conventional jet pumps in FIG. 16. In this comparison, the conventional jet pumps are the jet pumps having five nozzles as shown in FIG. 2 of Japanese Patent Laid-open No. Hei 7 (1995)-119700 and the jet pumps having the nozzle apparatus provided with a ring header and a cooling water suction passage in the axis as shown in FIG. 1 of Japanese Patent Laid-open No. 2008-82752. In each jet pump in Japanese Patent Laid-open No. Hei 7 (1995)-119700 and Japanese Patent Laid-open No. 2008-82752, each ejection outlet is disposed parallel to the axis of the jet pump, facing downward.

FIG. 16 shows a change in the jet pump efficiency to the M ratio for the jet pump having the nozzle apparatus 12B with no flow passage reduction portion in the throat and for the above-described jet pumps in the conventional examples. In the jet pump having the nozzle apparatus 12B with no flow passage reduction portion in the throat, as described above, the efficiency increases more than the conventional examples due to the reduction in the pressure loss in the nozzle apparatus 12B, and the increase in the flow rates Qb1 and Qb2 of the suction flows 32 and 32A. When the M ratio is increased for the power upgrade of the reactors, the efficiency of the jet pump having the nozzle apparatus 12B with no flow passage reduction portion in the throat is higher than the others as shown in FIG. 16.

Since the jet pump 11B of the present embodiment has the flow passage reduction portion 23 in the lower end portion of the throat 22 in the same manner as the jet pump 11 of the embodiment 1, by the influence of this flow passage reduction portion 23, the efficiency of the jet pump is reduced. However, this reduction in the efficiency can be compensated for by part of the increase in the efficiency achieved by the nozzle apparatus 12B. From the contribution of the remaining increase in the efficiency achieved by the nozzle apparatus 12B, the jet pump 11B, thus, can improve the efficiency of the jet pump more than those of the conventional examples.

The jet pump 11B of the present embodiment has the flow passage reduction portion 23 in the lower end portion of the throat 22 so that vibration can be suppressed.

The present embodiment can increase the efficiency of the jet pump as well as the flow rate of the cooling water 34 supplied to the core 2. The boiling water reactor having the jet pump 11B of the present embodiment, including the nozzle apparatus 12B, can easily handle a power upgrade which requires a large increase in the core flow rate. By using the nozzle apparatus 12B, a nozzle in a jet pump in an existing boiling water reactor can be quickly replaced. In addition, the vibration of the jet pump can be kept low.

[Embodiment 4]

A jet pump according to embodiment 4, which is another embodiment of the present invention, is described below. The jet pump of the present embodiment is a jet pump in which a leakage flow from the gap 27 in the slip joint 26 to the downcomer 6 is completely eliminated from the jet pump 11 of the embodiment 1.

To completely eliminate the leakage flow from the gap 27, the differential pressure between the inside of the slip joint 26 and the downcomer 6 should be zero. When the water head of a jet pump is H (Pa), the density of the fluid is ρ (kg/m³), and its speed is v (m/s), a static pressure Pi (Pa) of the slip joint 26 is represented in Equation (3) based on the static pressure in the downcomer 6.

$$Pi = H - 0.5\,\rho v^2 \qquad (3)$$

When Pi=0, the differential pressure between the inside of the slip joint 26 and the downcomer 6 becomes zero. The speed v is represented in Equation (4) using a jet pump flow rate Q (m³/s) and the inner diameter D6 of the outlet of the throat 22.

$$v = Q/(\pi D6^2/4) \qquad (4)$$

From Equation (3) and Equation (4), a value of the inner diameter D6 that makes Pi=0 is as in Equation (5).

$$D6 = (8\rho Q^2/7\pi H)^{0.25} \qquad (5)$$

Therefore, when the inner diameter D6 is within a range of $(8\rho Q^2/\pi H)^{0.25} \le D6 < D5$, the differential pressure between the inside of the slip joint 26 and the downcomer 6 can be reduced. A change in the static pressure in the axial direction of the jet pump when $D6 = (8\rho Q^2/\pi H)^{0.25}$ in the present embodiment is shown as the alternate long and short dash line in FIG. 7. The differential pressure between the inside of the slip joint 26 and the downcomer 6 becomes zero at the position of the slip joint 26, eliminating the leakage flow from the gap 27 in the slip joint 26.

In the present embodiment, each effect achieved in the embodiment 1 can be obtained. The vibration of the jet pump can be reduced more than in the embodiment 1.

[Embodiment 5]

Figure 17:
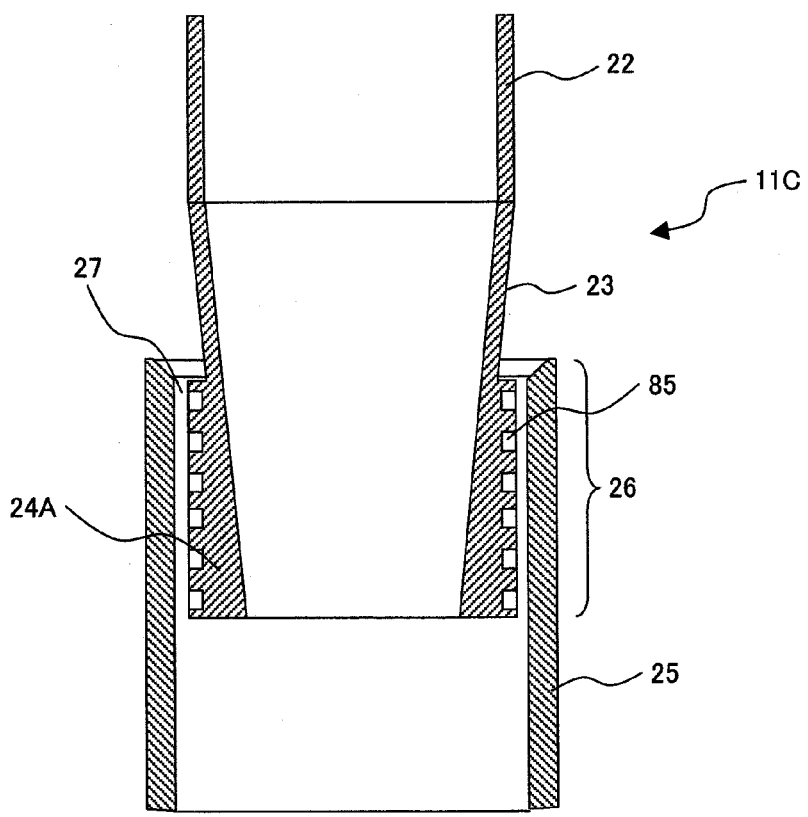
FIG. 17 is a longitudinal sectional view showing a slip joint in a jet pump according to embodiment 5 applied to a boiling water reactor, which is another embodiment of the present invention.

A jet pump according to embodiment 5, which is another embodiment of the present invention, is described below. A jet pump 11C of the present embodiment has a structure in which the throat 22 in the jet pump 11 of the embodiment 1 is replaced with a throat 22 having a labyrinth seal 85 on the outer surface of a thick-wall portion 24A of the flow passage reduction portion 23 shown in FIG. 17. Other components of the jet pump 11C are the same as the jet pump 11 of the embodiment 1.

Since the jet pump 11C is provided with the labyrinth seal 85 on the outer surface of the thick-wall portion 24A of the flow passage reduction portion 23, the resistance of the flow passage of the gap 27 is increased and thus a leakage flow from the inside of the slip joint 26 to the downcomer 6 can be reduced even more than the jet pumps in the embodiments 1 to 3. Consequently, the vibration of the jet pump 11C can be reduced. The jet pump 11C has the nozzle apparatus 12 so that each effect achieved by the jet pump 11 can be obtained.

The throat 22 provided with the labyrinth seal 85 on the outer surface of the thick-wall portion 24A of the flow passage reduction portion 23 may be applied to the jet pumps 11A and 11B.

INDUSTRIAL APPLICABILITY

The present invention can be applied to a boiling water reactor.

REFERENCE SIGNS LIST

1: reactor pressure vessel, 2: core, 3: core shroud, 6: downcomer, 7: recirculation pipe, 8: recirculation pump, 10: elbow pipe, 11, 11A, 11B, 11C: jet pump, 12, 12A, 12B: nozzle apparatus, 13: nozzle base, 14: nozzle, 15, 17: nozzle straight-tube portion, 16, 18: nozzle narrowing portion, 19: nozzle lower end portion, 20, 20B: ejection outlet, 20A: annular ejection outlet, 21: bell mouth, 22: throat, 23: flow passage reduction portion, 25: diffuser, 26: slip joint, 30: driving flow (driving fluid), 31, 31A: jet flow, 32, 32A: suction flow (suction fluid), 40, 61: nozzle portion, 41: outer cylinder member, 42: inner cylinder member, 43: outer funnel member, 44: inner funnel member, 45: annular passage, 46: nozzle header portion, 47, 62: outer cylinder member, 48, 63: inner cylinder member, 49: annular header portion, 50: inner cooling water to suction passage, 54: flow-adjusting plate, 57: joint portion, 64: jet passage, 65: suction passage portion, 66, 81: cylinder member, 67: flow passage forming member, 70: lower region, 71: curved surface, 72: passage member, 73: suction passage, 74: opening, 77: decompression chamber, 78: nozzle holder, 79: reinforcing streamline plate, 80: cone member.

What is claimed is:

1. A nozzle apparatus of a jet pump comprising:
   a nozzle base member; and
   a plurality of nozzles installed to the nozzle base member and protruding in a downward direction from an upper part of the base member;
   wherein three narrowing portions are formed in each of the downwardly protruding nozzles so that a fluid passage cross-sectional area of a driving fluid passage formed in each nozzle is reduced three times in the downward direction from an upstream part to a downstream part of the driving fluid passage.

2. The nozzle apparatus of a jet pump according to claim 1, wherein the driving fluid passage of each of the nozzles has a first nozzle narrowing portion, a first nozzle straight-tube portion, a second nozzle narrowing portion, a second nozzle straight-tube portion, a third nozzle narrowing portion, and a nozzle lower end portion;
   wherein an ejection outlet is formed at a lower end of the nozzle lower end portion and communicated with the driving fluid passage; and
   wherein the first nozzle narrowing portion, the first nozzle straight-tube portion, the second nozzle narrowing portion, the second nozzle straight-tube portion, the third nozzle narrowing portion, and the nozzle lower end portion are disposed in this order from the upper part of the nozzle base member to the ejection outlet.

3. The nozzle apparatus of a jet pump according to claim 2, wherein a narrowing angle of the third nozzle narrowing portion is larger than that of the second nozzle narrowing portion.

4. The nozzle apparatus of a jet pump according to claim 2, wherein an inner diameter of the first nozzle straight-tube portion is D1, an inner diameter of the second nozzle straight-tube portion is D2, and an inner diameter of the nozzle lower end portion is D3, and wherein the inner diameters D1, D2 and D3 have a relationship which is D1>Dl>D3.

5. The nozzle apparatus of a jet pump according to claim 2, wherein the nozzle lower end portion is a straight-tube portion, and wherein an inner diameter of the first nozzle straight-tube portion is D1, an inner diameter of the second nozzle straight-tube portion is D2, and an inner diameter of the nozzle lower end portion is D3, the inner diameters D1, D2 and D3 have a relationship which is D1>D2>D3.

* * * * *